(12) United States Patent  (10) Patent No.: US 6,611,241 B1
Firester et al.  (45) Date of Patent: Aug. 26, 2003

(54) MODULAR DISPLAY SYSTEM

(75) Inventors: Arthur Herbert Firester, Skillman, NJ (US); Donald Barry Carlin, Pennington, NJ (US); Herschel Clement Burstyn, Princeton, NJ (US); Dennis John Bechis, Yardley, PA (US); Bawa Singh, Voorhees, NJ (US); Joseph Thomas McGinn, Flemington, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/200,081

(22) Filed: Nov. 25, 1998

Related U.S. Application Data

(60) Provisional application No. 60/067,248, filed on Dec. 2, 1997.

(51) Int. Cl.[7] ............................................. G09G 5/00
(52) U.S. Cl. ........................ 345/1.3; 345/1.1; 348/383
(58) Field of Search ............................ 345/1.1, 1.3, 9, 345/903, 2.1, 3.3; 348/383, 658

(56) References Cited

U.S. PATENT DOCUMENTS 4,792,720 A  * 12/1988  Takenaka et al. ............ 313/409

(List continued on next page.)

FOREIGN PATENT DOCUMENTS

| EP | 0 739 131 A | 10/1996 | ........................ 5/74 |
| EP | 0 739 133 A | 10/1996 | ........................ 5/74 |
| JP | 57 111187 A | 7/1992 | ........................ 5/74 |

OTHER PUBLICATIONS

Written Opinion corresponding to PCT/US98/25552.
M. Nakano, "Fujitsu Kiden Multipanel LCD Produces an Ultra–thin 78–inch display, at a mere 28 cm Thick", *LCD Intelligence*, Ref. No. LCD–2–14–14 (7–2, p. 47) Apr. 1997, pp. 1–2.
Robert R. Simpson, "Videowalls: The Book of the Big Electronic Image", 2nd Edition, Jun. 1997.
International Search Report.

*Primary Examiner*—Richard Hjerpe
*Assistant Examiner*—Kevin M. Nguyen
(74) *Attorney, Agent, or Firm*—William J. Burke

(57) ABSTRACT

Large visual displays are comprised of an array of smaller display devices or modules, each of which displays a portion of the image to be displayed so that together the array of smaller display devices displays the complete image. Unlike conventional large displays which necessarily seek to minimize the edge areas of the smaller display elements that do not display an image so as to minimize the "seams" or gaps between the image portions, the present display device projects image portions scanned from less than the entire display area of the smaller display devices in an array to create an image on a substantially flat panel that is substantially free of visual "seams" or gaps between the image portions. Thus the display device may employ display elements that do not have narrow edges and that are not contiguous to generate overlapping sub-images. Image pixels in what would otherwise be "seams" or gaps are generated from the image data and are displayed in proper position and brightness in the displayed image, such as in the overlap regions of overlapping sub-images. Where the scanning beams are electron beams, the flat panel is a faceplate that includes phosphors that are excited by the electron beam to produce light, and where the beams are light beams, the flat panel is a distributor of light, such as a diffuser panel.

42 Claims, 10 Drawing Sheets

U.S. PATENT DOCUMENTS

| | | | |
|---|---|---|---|
| 4,825,201 A | * | 4/1989 | Watanabe et al. ............. 345/2.1 |
| 4,890,314 A | * | 12/1989 | Judd et al. ................ 348/14.01 |
| 4,969,731 A | * | 11/1990 | Ogino et al. ................... 353/34 |
| 5,005,950 A | * | 4/1991 | Morin ............................ 349/5 |
| 5,136,390 A | * | 8/1992 | Inova et al. ................. 348/383 |
| 5,231,481 A | * | 7/1993 | Eouzan et al. ............... 348/658 |
| 5,264,941 A | | 11/1993 | Nakano et al. .............. 348/383 |
| 5,396,257 A | | 3/1995 | Someya et al. .............. 345/1.1 |
| 5,475,447 A | * | 12/1995 | Funado ....................... 348/745 |
| 5,612,741 A | * | 3/1997 | Loban et al. ................ 348/383 |
| 5,694,003 A | * | 12/1997 | Takahashi et al. ............. 315/9 |
| 5,734,446 A | * | 3/1998 | Tokoro et al. ............... 348/745 |
| 5,784,035 A | * | 7/1998 | Hagiwara et al. ............. 345/1.3 |
| 5,793,441 A | * | 8/1998 | Hagerman ................... 348/658 |
| 5,956,000 A | * | 9/1999 | Kreitman et al. ............. 345/1.3 |
| 6,075,567 A | * | 6/2000 | Ohnishi ....................... 348/383 |
| 6,181,392 B1 | * | 1/2001 | Greene et al. ................. 349/74 |
| 6,219,011 B1 | * | 4/2001 | Aloni et al. ..................... 345/1 |
| 6,219,099 B1 | * | 4/2001 | Johnson et al. .............. 348/383 |
| 6,243,055 B1 | * | 6/2001 | Fergason ..................... 345/32 |

* cited by examiner

MODULAR DISPLAY SYSTEM

This Application claims the benefit of U.S. Provisional Application Ser. No. 60/067,248 filed Dec. 2, 1997.

The present invention relates to display devices and, in particular, to display devices comprising plural display elements.

The standard for conventional displays is the cathode ray tube ("CRT") display such as is employed in television receivers, computer displays, information displays such as for airport and train station travel information and the like. CRTs have the desirable characteristics of a clear, bright display, even when viewed from a position off to the side, i.e. off its central axis, coupled with reliability and stability, all at low cost. As a result of the structures and dimensions of the deflection arrangements required to scan the electron beam of a CRT over its phosphor-coated faceplate, the depth of a CRT is typically about as great as the diagonal of the display faceplate. While this is acceptable for moderate screen sizes, for example, up to about 35 inch diagonal dimension, the depth becomes excessive for larger screen sizes. Even CRTs having screen diagonals of 25 to 35 inches may be too deep for convenient use in smaller rooms. Larger conventional optical projection displays have images in the 35- to 45-inch diagonal range, but also have substantial depth and do not have the image brightness, especially from off-central viewing positions, and stability of CRTs.

One conventional solution is to create a larger display by placing several smaller displays side by side. For example, twelve television sets or other CRT displays DD1 through DD12 could be stacked up three high by four wide to create a large screen display 10 in which one-twelfth of the image is displayed on each television set DD1–DD12, as illustrated in FIG. 1. However, because the CRT in each television set both does not display an image all the way to the edges of its faceplate, and because the glass envelope of the faceplate is not exactly rectangular, there will necessarily be horizontal and vertical spaces 11, 12, 13, 14, 15 between the edges of the respective CRTs where no image is present. These spaces are often referred to as "seams" or "gaps." While designers of large displays have tried to minimize the inactive edge areas of display modules comprising such display, and thereby minimize these seams or gaps, they have not been able to eliminate them, and so visible and annoying gaps remain in the images displayed by such devices.

Even with rear-projection systems, the mullions of their respective diffuser panels leave a visible image-less seam. Front-projection systems have eliminated the mullion problem, but have great difficulty in projecting a true combined image in the seam areas which are usually sought to be minimized by involved and time-consuming complex set up and alignment procedures. In any of the foregoing arrangements, differences in resolution, geometry, brightness, intensity, and color between the portions of the combined image, or sub-images, produced by the various display units making up a larger display can produce noticeable variations in the displayed image. Such effects are well known and easily seen, for example, in the jumbo television displays often used at sporting arenas, concerts and outdoor events.

In addition to the desire for large image size, there is also a need for high image resolution along with large size. This need is evident, for example, regarding high-definition television (HDTV) systems and industrial and military displays. For high-definition displays of maps and charts, or of surveillance images, displays having resolutions of 100 dots per inch over a 30×40 inch display are desired. Such images include 12 mega-pixels of displayed information. Unfortunately, displays having such capabilities do not exist with conventional technologies. It is further desirable that such large display devices be easily transported and set up, and that they be available at a reasonable cost.

Accordingly, there is a need for a display system that is capable of providing high resolution and a virtually seamless image even over a relatively large display area.

To this end, the present invention comprises at least two image generators generating adjacent portions of an image on a screen, wherein the adjacent portions of the image overlap; and an image processor providing image data to the image generators including pixel data representative of particular pixels in the overlap that are adjusted so that the respective pixels generated therein by the two image generators combine to form the particular pixels.

According to another aspect of the present invention, a method of forming a substantially seamless pixelated image comprises:

forming two contiguous pixelated sub-images having a region of overlap at their common edge;

determining the value of particular pixels in the region of overlap;

determining a correction function for changing the determined value of the particular pixels in the overlap region to a given value; and applying the correction function to respective pixel values of each of the pixelated sub-images for each of the particular pixels in the overlap region.

BRIEF DESCRIPTION OF THE DRAWING

The detailed description of the preferred embodiments of the present invention will be more easily and better understood when read in conjunction with the FIGURES of the Drawing which include.

DESCRIPTION OF THE PREFERRED EMBODIMENTS

Figure 1:
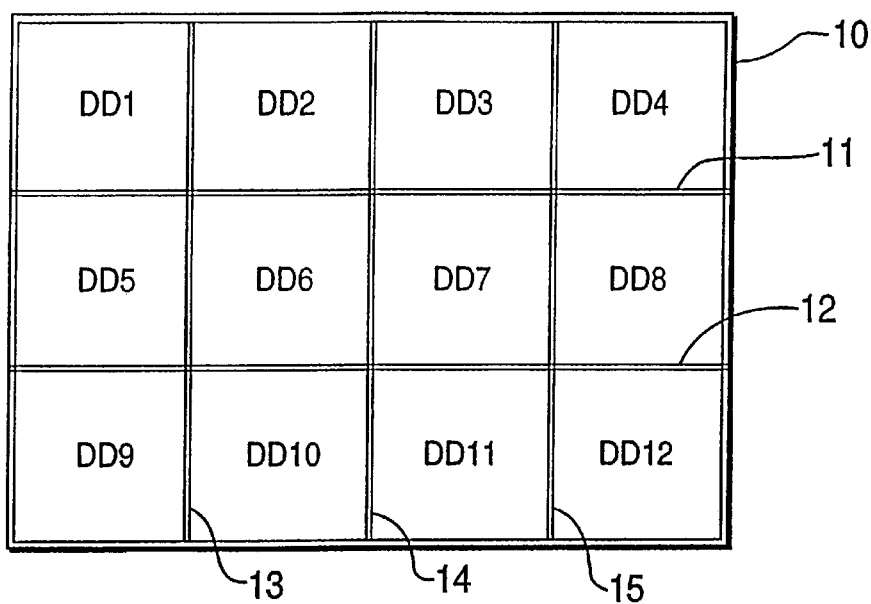
FIG. 1 is a diagram of a prior art modular display device.
Figure 2:
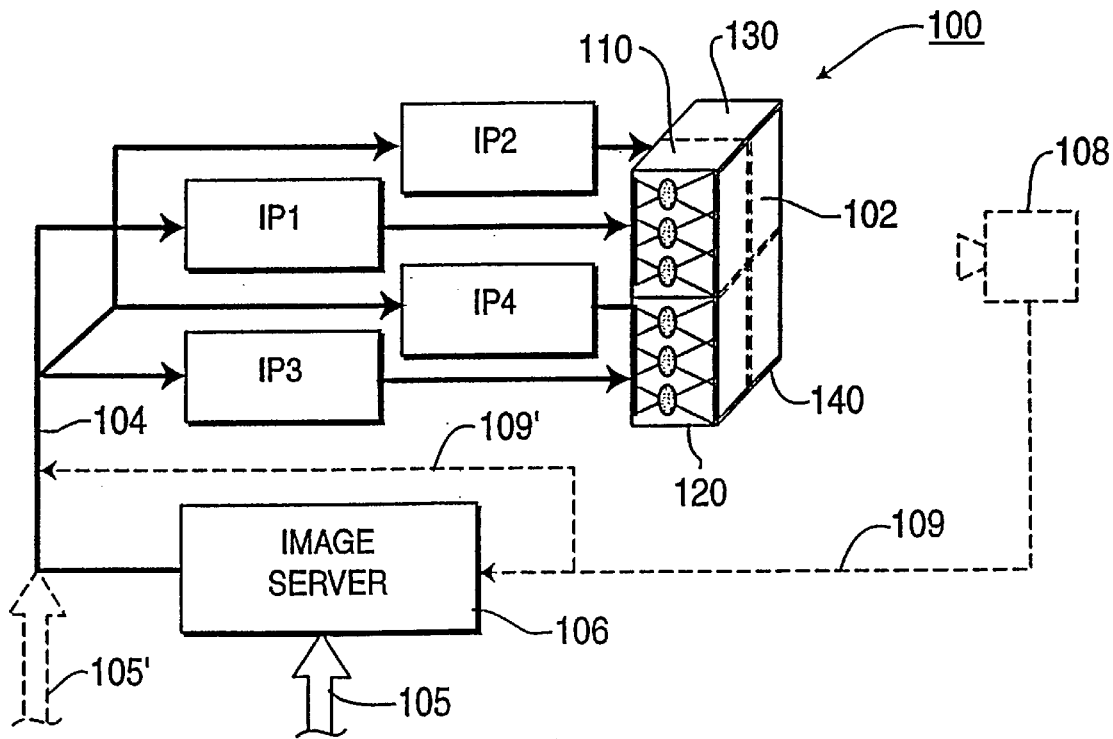
FIG. 2 is a schematic block diagram of an exemplary embodiment of a display system according to the present invention.

In the display system of FIG. 2, an exemplary display system 100 includes a display screen 102 on which an image is displayed and a plurality of image generating devices or modules 110, 120, 130, 140. In this example, a 2×2 array of four image generators or modules 110, 120, 130, 140 (which are not fully visible in FIG. 2), which may be only a portion of a larger display system, generate the image display. Screen 102 may be a faceplate on which is arrayed a pattern of phosphor elements, such as stripes or "dots," that emit light when illuminated by an electron beam, as on the faceplate of a color display CRT. Each of image generators 110, 120 . . . generates an electron beam that is scanned across the portion of screen 102 that is proximate to that image generator and which electron beam is modulated in intensity in accordance with the image data to modulate the brightness of the light produced by each phosphor element, thereby to produce a portion, or sub-image, of he total image displayed.

Alternatively, screen 102 may be an optical (light) distributor that transmits and distributes light when it is illuminated by a light beam, as on the screen of a rear-screen color projection display. An optical distributor receives an incoming beam of light coming from a given direction and spreads the outgoing beam of light angularly over a desired region, such as a solid angle. For example, a diffuser is a distributor that operates by scattering incoming light. In this case, each of image generators 110, 120 . . . generates a light beam that illuminates the portion of screen 102 that is proximate to that image generator and the light beam is modulated in intensity in accordance with the image data to modulate the brightness of the light transmitted by distributor screen 102, thereby to produce a portion, or sub-image, of the total image displayed. As is described below, the image portion displayed on screen 102 by each display module 110, 120 . . . overlaps along each of its edges the image portion displayed by the display modules adjacent thereto, whether such display modules are physically mounted in a display module structure or are mounted in separate display module structures that are abutted one to the other, thereby avoiding any inter-module gap. Thus there are areas of overlap and no seams or gaps between the image portions or sub-images produced by the various display modules. Display modules 110, 120, . . . may employ active matrix liquid crystal display (AMLCD) devices of the sort that are widely employed in laptop computers. Suitable AMLCD panels include type LT-170E101 commercially available from Samsung located in Seoul, Korea.

The overlapping of adjacent sub-images in a seamless fashion requires the ability to correct at least the intensity of the pixels of each sub-image in its overlap regions. This requirement is addressed by image processing that adjusts or predistorts each sub-image, preferably on a pixel-by-pixel basis, and controls the intensity of the pixels that comprise such sub-image. It is also provided that the image processing adjusts or predistorts each sub-image in regions outside of their respective overlap regions to compensate for differences between and among the various image generators.

Associated with each image generator 110, 120 . . . is a respective image processor IP1, IP2, IP3, IP4 that respectively processes image data received from an image server 106 and generates image data on a pixel-by-pixel basis for each pixel reproduced by its associated image generator 110, 120, . . . , respectively. Image server 106, which may be a commercially available Pentium® MMX processor, provides image data received from an image source (not shown, such as a static image memory or a network, or a source of plural images sequenced in time, as in a video or motion picture, or in space, as in an image mosaic, and in any of a number of image data formats, such as compressed image data, graphic language commands, bit maps and the like) via data bus 105 for all the portions comprising the image displayed on screen 102 that it sends via a data bus 104 to each of the image processors IP1, IP2, IP3, IP4. Image processor IP1 processes the image data for the portion of the image produced by image generator 110, such as by reformatting, decompressing, rendering, decoding, and predistorting, and sends that modified image data to image generator 110 on a pixel-by-pixel basis. Images, and sub-images, formed on a pixel-by-pixel basis or resolvable into pixels are generally referred to herein as pixelated images. Image processors IP1–IP4 may be 350 MHZ Pentium® MMX processor desktop-type computers (PCs) in conjunction with respective multi-media processors to perform the real-time digital corrections of the image data. Each Pentium® MMX processor PC, may include a 128-Megabyte (MB) SDRAM memory, a 512-Kilobyte (KB) pipelined burst SRAM cache memory and a hard drive to perform the set-up, calibration, image acquisition and control of the multi-media processor. Image server 106 may be a like computer. Such PCs are widely available from many manufacturers, such as IBM, Compaq, Hewlett Packard, Dell and Gateway, among many others.

The Matrox Genesis multi-media processor commercially available from Matrox Electronic Systems Ltd. of Quebec, Canada, is suitable for use in image processors IP1–IP4 of the display system described herein. The Matrox Genesis processor is capable of operating at 100 billion operations per second (BOPS) and so can directly provide image data for displays having up to 1600×1200 24-bit pixels in response to input image data provided by either digital or analog cameras, or other sources. Processing is performed by a Texas Instrument C80 processor that is capable of accelerating the full range of operations employed in image processing, such as point-, neighborhood- geometric- and pattern-matching operations. The Matrox Genesis multi-media processor further includes a Neighborhood Operations Accelerator ASIC (NOA2) that further accelerates image processing operations, such as convolutions, morphology, normalized gray-scale correlations, and that also includes a JPEG coder/decoder (codec). Even with a processor operating at 2 BOPS, for example, the multi-media processor can perform about 2000 operations per pixel per second; which would allow the image data to be updated about three to ten times per second under a typical condition where about four-hundred digital operations per pixel are required for digital image correction in a display system having a 4×4 array of image generators.

Shown in phantom in FIG. 2 is a sensor 108 that is temporarily put into place to sense the image displayed on screen 102 for purposes of set up and/or calibration. Sensor 108 may be a CCD television camera or other similar sensor. For calibration or set up, image server 106 causes a predetermined image, such as a checkerboard, cross-hatch or other test pattern, to be displayed on screen 102. The test pattern image is observed via sensor 108 for uniformity of brightness, alignment of edges and other image characteristics. At certain times sensor 108 senses the entire image area of screen 102, at other times senses ones of the sub-images thereon, and at yet other times senses the overlap regions of contiguous sub-images, for generating appropriate correction functions for uniformity of brightness, pixel registration, focus distortion and other characteristics of the image and particular pixels or neighborhoods of pixels thereof. Image server 106 and image processors IP1–IP4 adjust the relative brightness of the respective sub-image generators 110, 120, . . . for a uniform brightness across the display on screen 102, adjust the alignment of edges and lines by shifting sub-images horizontally or vertically, and may also adjust other display characteristics such as colorimetry, in an iterative process employing updated data from sensor 108. A Sony model SSC-C370 CCD television camera available commercially from Edmund Scientific, located in Barrington, N.J., is suitable for sensor 108.

Alternatively, server 106 may be eliminated and the functions performed thereby as described above may be performed by image processors IP1, . . . IP4 being directly coupled to the image source, such as an Ethernet or other network, as illustrated by the data buses 105' and 109' shown in phantom in FIG. 2, as may be desirable where a modular display system 100 is desired. In this embodiment, each display module (including an image processor IP1, . . . IP4 and an image generator 110, 120 . . . ) determines the portion of the image data that it will accept and respond to. Image data received via Ethernet or other network 105' is applied via data bus 104 to image processors IP1, . . . IP4, each of which selects and accepts those portions of such image data that it can utilize to generate its respective portion of the sub-images, for example, by reading and acting upon the header data and control data included in the information packets containing image data sent via network 104, 105'. Similarly, image data from display screen 102 sensed by sensor 108 is applied directly via data buses 109, 109' and 104 to image processors IP1, . . . IP4, , each of which selects and accepts those portions of such sensed image data that it can utilize to correct its respective portion of the sub-images.

Data buses 104, 105, 105', 109, 109' may be, for example, Ethernet or LAN or similar commercially available networks capable of data communication at a data rate of about 100 Megabits per second (MBPS). If the image stored in image server 106 or received via network 105' is a bit-mapped image having 16 Megapixels of 24 bits each, the image will load to image processors IP1–IP4 in about four seconds. This image transfer rate can be increased, if necessary, by increasing the data transmission rate of data buses 104, 105, 105' such as to 200 MBPS, or by compressing the image data prior to transmission thereof to image processors IP1–IP4 which then de-compress the image data after receipt, in known manner.

Thus, the display system of the present invention forms overlapping sub-images with redundant pixels and then performs real-time digital signal processing to preserve substantially full resolution in the overlap regions and may also compensate for image generator variations, physical tolerances, optical imperfections, distortions, setup errors, and drift, for pixels in the overlap region as well as for pixels outside of the overlap region of the sub-images. Overlapping images are reformatted in real-time by a PC-based system that compensates for the image overlaps, individual image distortions, pixel position errors and sub-image-to-sub-image matching so that there are neither visible seams nor apparent loss of resolution between the sub-images that together comprise the displayed image.

To this end, sensor 108 is directed particularly to the regions of overlap between adjacent sub-images. For example, without correction, the overlap regions would be brighter than the surrounding sub-images because more than one image generator 110, 120 is generating those pixels. In response to data from sensor 108, image server 106 controls image processors IP1, IP2, . . . to reduce the brightness of their respective edge-region pixels so that the combined image is of the correct brightness level. In other words, to compensate for such increased brightness, each pixel sent to one of image generators 110, 120, . . . is comprised of a weighted linear combination of the local neighborhood of pixels in the source image, for example, pixels in a 2×2 pixel neighborhood. For pixels in the regions of overlap of the sub-images, the values of the pixels in each sub-image contributing thereto is weighted so that the combined total value for each pixel corresponds to the value of that pixel in the source image, for example, as by proportional weighting. Thus, the image intensity is not simply "feathered" in the overlap regions, but can be corrected to any desired degree, both in the overlap regions of the sub-images as well as in the remainder thereof, limited by the processing capabilities of the processors 110, 120 employed.

In addition to the pixel intensity being digitally adjusted to blend the images in the overlap region and to account for the differences in the intensity transfer characteristic of the image generators, the pixels in each sub-image can also be predistorted or "warped" to compensate for geometrical and other distortions in the optics or scanning structures of image generators 110,120. Further, chromatic aberrations can be corrected by making the geometrical compensation color-dependent; pin-cushion and barrel distortions can also be corrected by image transformation in image processors 110, 120, . . .

For example, if two image generators 110, 120 are contributing to a given pixel, then the brightness of each image generator is reduced proportionately, such as to produce about one half of the total brightness. Thus, in an eight-bit pixel value display, if a pixel in the two-sub-image-overlap region has a value of 162 (out of 256) in the source image, the sum of the two contributing sub-image pixel values will be 162. Thus, each may have a value of 81, or, alternatively, one could have a value of 102 and the other a value of 60, or any other combination of values summing to 162. Similarly, if four image generators 110, 120 are contributing to a given pixel, as is the case in corners of sub-images where four sub-images overlap, then the brightness of each image generator is reduced proportionately, such as to produce about one fourth of the total brightness. Thus, if a pixel in the four-sub-image-overlap region has a value of 184 (out of 256) in the source image, the sum of the four contributing sub-image pixel values will be 184. Thus, each may have a value of 46, or, alternatively, ones could have respective values of 36, 42, 50 and 56, or any other combination of values summing to 184. Thus, image processors IP1, IP2, . . . adjust the brightness of each pixel in each overlap region so that the combined total brightness from all image generators contributing to any particular pixel is the correct pixel brightness for that pixel in the displayed image, for example, by applying a proportionately weighted correction factor. In addition, image processors IP1, IP2, . . . also adjust the brightness of each pixel in each sub-image so that the total brightness level produced by each of the image generators is uniform over the entire displayed image, in conjunction with adjusting the values of sub-image pixels contributing to any particular pixel in the displayed image, whereby each pixel has the correct source-image pixel brightness for that pixel in the displayed image.

It is noted that the correction or adjustment of pixel values may be based upon characteristics of individual pixels or upon characteristics of pixels in a neighborhood of pixels, and that such characteristics may include pixel intensity or brightness and/or pixel position. As a result the fully digital processing and display panel drive enable the corrected image information to be accurately placed at the correct color pixel location in a sub-image with the correct intensity, and for each sub-image to be accurately placed at the correct color pixel location in the complete image with the correct intensity.

Figure 3:
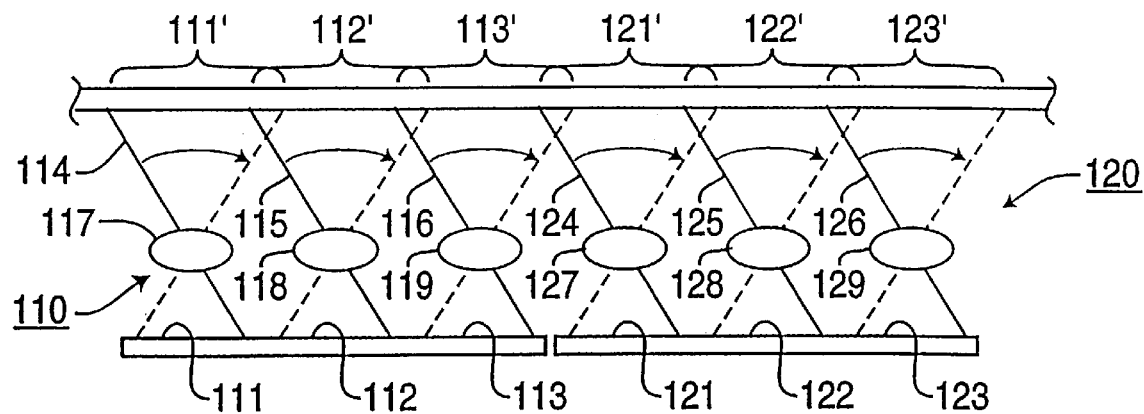
FIG. 3 is a representative diagram of a portion of an exemplary image generator usable with the embodiment of FIG. 2.

The aforementioned image data is structured by image processors IP1–IP4 in the manner appropriate to the particular input source image data format, whether from image server 106 or from a network 105, 105'. FIG. 3 is an expanded diagram showing two adjacent exemplary image generators, such as image generators 110, 120 shown in FIG. 2. Image generators 110 and 120 are preferably active matrix liquid crystal displays (AMLCD) of the sort currently found in laptop portable computers on which a plurality of image portions or sub-images are produced. Image generator 110 produces image portions or sub-images in display areas 111, 112, 113 that are slightly expanded or enlarged by lenses 117, 118, 119 (each of which may include a plurality of optical elements or lenses) to produce overlapping sub-images 111', 112' 113' on screen 102. In like manner, image generator 120 produces image portions or sub-images in display areas 121, 122, 123 that are slightly expanded or enlarged by lenses 127, 128, 129 to produce overlapping sub-images 121', 122' 123' on screen 102. In FIG. 3 the extremes of the light beams of each sub-image are represented by beams 114, 115, 116, 124, 125, 126, and the curved arrows associated therewith. Note that even though adjacent display areas 111, 112, 113, 121, 122, 123 are separated by gaps, i.e. they are not contiguous, the corresponding sub-images 111', 112', 113', 121', 122', 123' on screen 102 overlap and have no seams or gaps. The same is true for image generators 110 and 120 which may be spaced apart, and so may have a substantial edge area or a gap where no image is produced, yet the adjacent sub-images 113' and 121' produced respectively by adjacent sub-image display areas 113 and 121 also have an overlap region along their adjacent edges. Accordingly, the heretofore virtually unsolvable problem of creating an image generator that generates images all the way out to its edges is eliminated, as are objectionable seams and gaps.

Figure 4:
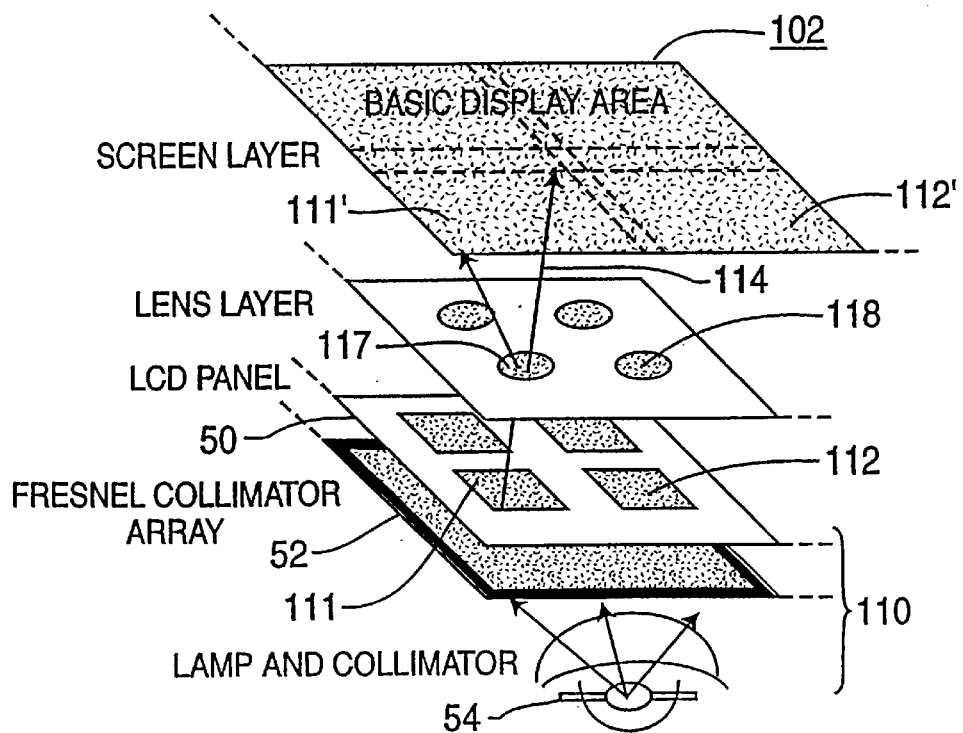
FIG. 4 is an exploded view of an exemplary physical embodiment of a portion of an image generator usable with the embodiment of FIG. 2.

FIG. 4 illustrates an expanded or exploded view of an exemplary physical embodiment of the image generator 110 and its associated elements of FIG. 3. AMLCD image generator 110 includes a transmissive liquid crystal panel 50 that is logically segmented to display a plurality of adjacent, non-contiguous sub-images 111, 112 thereon in response to image data, i.e. not all the available display area is utilized for producing sub-images. In particular, the specific pixels of image generator 110 that display each sub-image 111, 112 are selected for proper registration of the adjacent sub-images 111', 112' on screen 102 with predetermined overlap (illustrated as regions on screen 102 enclosed by dashed lines), and the other areas of image generator 110 are blanked electronically. AMLCD panel 50 is back-lit by light produced by lamp light source and collimator 54, which light is further collimated by Fresnel collimator array 52. As sub-image 111, for example, is generated, light beam 114 therefrom passes through lens 117 and illuminates sub-image portion 111' on screen 102. Lenses 117, 118 . . . are fabricated in a matrix layer and have slightly greater than unity magnification. It is noted that high screen pixel densities are achieved by this arrangement. For example, if 75% of the available linear dimension or 75%×75%=56% of the available area of a 13.3 inch diagonal 1600×1200 pixel AMLCD panel 110 is utilized to produce a 14 inch diagonal sub-image on screen 102, the resulting sub-image has a resolution of about a 1200×900 pixel, or about 1.6 megapixels per square foot.

Figure 5:
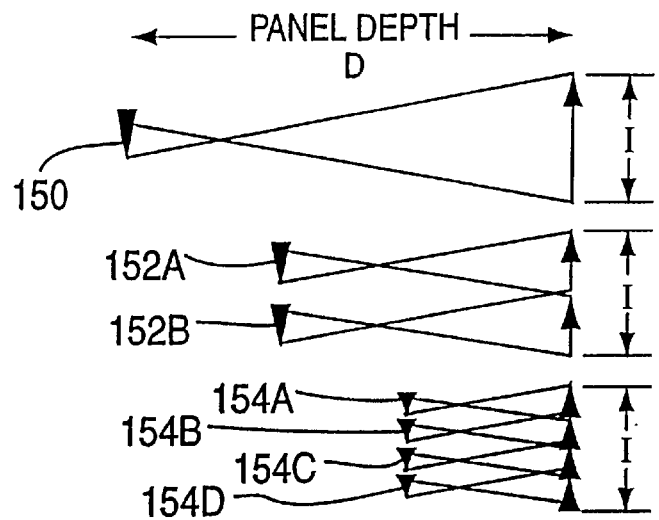
FIG. 5 is a diagrammatic representation illustrating the relationship between the size and number of sub-images and a dimension of a display system.

FIG. 5 shows three representations of exemplary modular display systems of the sort described in relation to FIGS. 2–4 above to illustrate the relationship between the size and number of the sub-images employed and the depth dimension "D" of the modular display system, for a particular size "I" of the displayed image. In the upper representation, one relatively large image 150 is generated to produce the displayed image and the resulting display system depth is relatively large. In the middle representation, two relatively smaller sub-images 152A, 152B are generated to together produce the displayed image and the resulting depth D is substantially smaller than in the one-image example. In the lower representation, four relatively smaller yet sub-images 154A, 154B, 154C, 154D are generated to produce the displayed image and the resulting depth D is relatively smaller yet. One advantage of this arrangement is that the beams from adjacent image generators impinge upon the screen at almost the same angle of incidence which beneficially reduces image variations on a diffusive screen, particularly for viewers who are viewing from positions off the central axis of the display. As noted above, the adjacent sub-image generators need not be contiguous to develop a seamless displayed image. Because the lenses have magnification of greater than unity and the displayed sub-images overlap, the reduction of depth D that results from each doubling of the number of sub-images is less than one half the depth.

Figure 6:
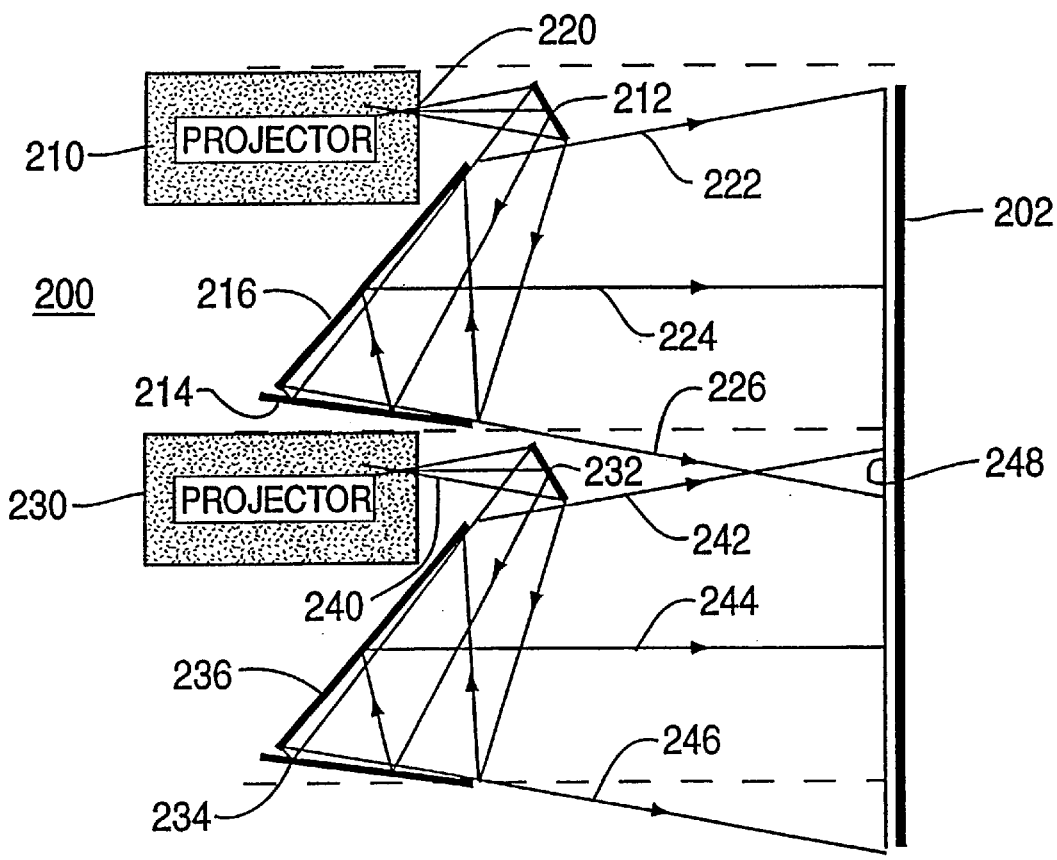
FIGS. 6 and 7 are diagrams showing side and front views of another alternative exemplary physical embodiment of a portion of an image generator usable with the embodiment of FIG. 2.
Figure 7:
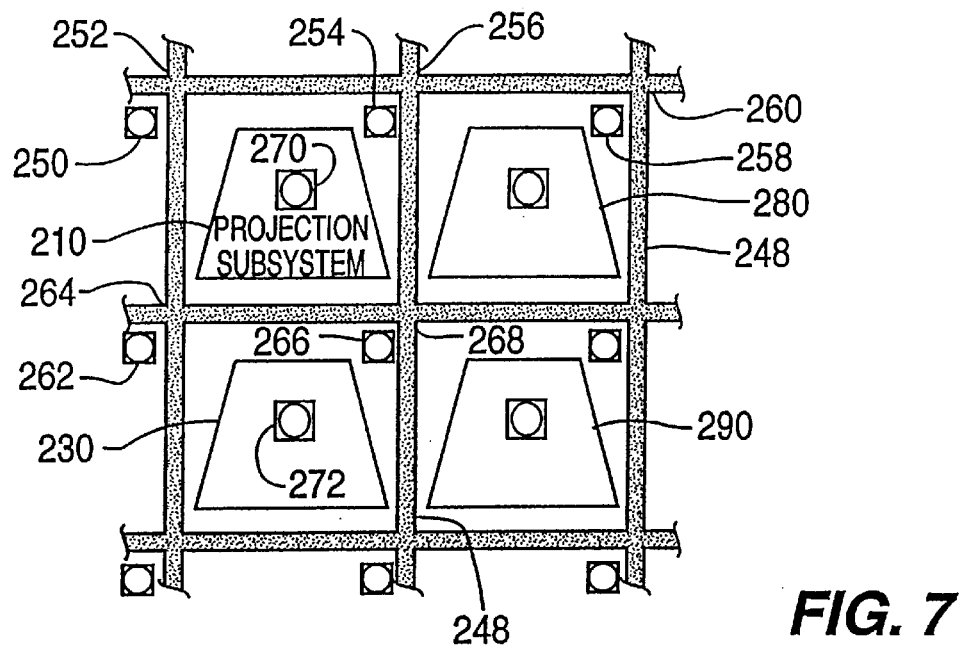

FIGS. 6 and 7 are respectively side and front views of an alternative embodiment of a portion of a display system according to the present invention that employs a plurality of large-area optical projectors 210, 230 . . . as the image generators 110, 120 . . . of FIG. 2. Projector 210, which may have the light projected through projection lens 220 modulated by a liquid crystal panel, projects a sub-image onto optical distributor screen 202 via a three-stage folded-mirror optics arrangement including first mirror 212, intermediate mirror 214 and final mirror 216. Mirrors 212, 214, 216 are preferably flat, but may be convex to provide additional magnification. The center line of the sub-image projected by projector 210 is represented by light ray 224 and the upper and lower edges thereof are represented by light rays 222 and 226, respectively. Similarly, projector 230, which may also have the light projected through projection lens 240 modulated by a liquid crystal panel, projects a sub-image onto screen 202 via a like folded-mirror optics arrangement including first mirror 232, intermediate mirror 234 and final mirror 236. Mirrors 232, 234, 236 are preferably flat, but may be convex to provide additional magnification. The center line of the sub-image projected by projector 230 is represented by light ray 244 and the upper and lower edges thereof are represented by light rays 242 and 246, respectively. Adjacent sub-images projected by projectors 210, 230 overlap in a region 248 along their respective edges, as indicated by the intersection of light rays 226 and 242 before they impinge upon screen 202.

In FIG. 7, a front view of the portion of the display system of FIG. 6, four optical projectors 210, 230, 280, 290 are arrayed to project adjacent sub-images that overlap in horizontal and vertical regions 248 along their respective peripheries as is illustrated by the darkened vertical and horizontal bands forming an array of rectangles. Intersections of the overlap regions 248 are designated 252, 256, 260, 264, 268. An advantage of this arrangement is that sensors to sense the pixels in the overlap regions 248 of the displayed image can be positioned behind screen 202 rather than in front of the screen (as is the case illustrated for sensor 108 in FIG. 2), thereby being better able to remain in position and operating while the display system is operating to display images rather than only during set up and calibration operations. To this end, a plurality of sensors such as CCD cameras 250, 254, 258, 262, 266 are positioned to sense pixels in the intersections 252, 256, 260, 264, 268, respectively, of overlap regions 248 for processing by image server 106 and image processors IP1–IP4 as described above. This produces pixels in the overlap regions by combining pixels produced by adjacent image generators 210, 230, 280, 290 which are generated in relation to each other and the true pixel, so that the resulting combined pixels are those of the image being displayed. The number of sensors required for sensing the overlap intersection regions in an array of M×N sub-image generators is given by (M+1)(N+1)=MN+M+ N+1 for the arrangement shown in FIG. 7. In addition, one sensor is employed for each optical projector for sensing and mapping the image intensity profile of each sub-image display which is digitally processed by image server 106 and image processors IP1–IP4 to make uniform the intensity pattern of the overall image, such as by digital apodization of the luminance data. It is noted that the correction of pixel values may be based upon characteristics of individual pixels or upon characteristics of pixels in a neighborhood of pixels, and that such characteristics may include pixel intensity or brightness and/or pixel position.

In a typical projection display arrangement 200 of the sort shown in FIGS. 6 and 7 in which each projector 210, 230 projects a sub-image that is 18 inches high by 24.5 inches wide and that overlaps the adjacent sub-image by two inches, a 56.5 inch optical length via the folded-mirror optics is achieved in a physical depth of about 36 inches. Suitable optical projectors include type X-200 commercially available from Mitsubishi located in Cyoress, Calif., and suitable CCD cameras include Panasonic type GP-US502 commercially available from Edmund Scientific located in Barrington, N.J.

Figure 8:
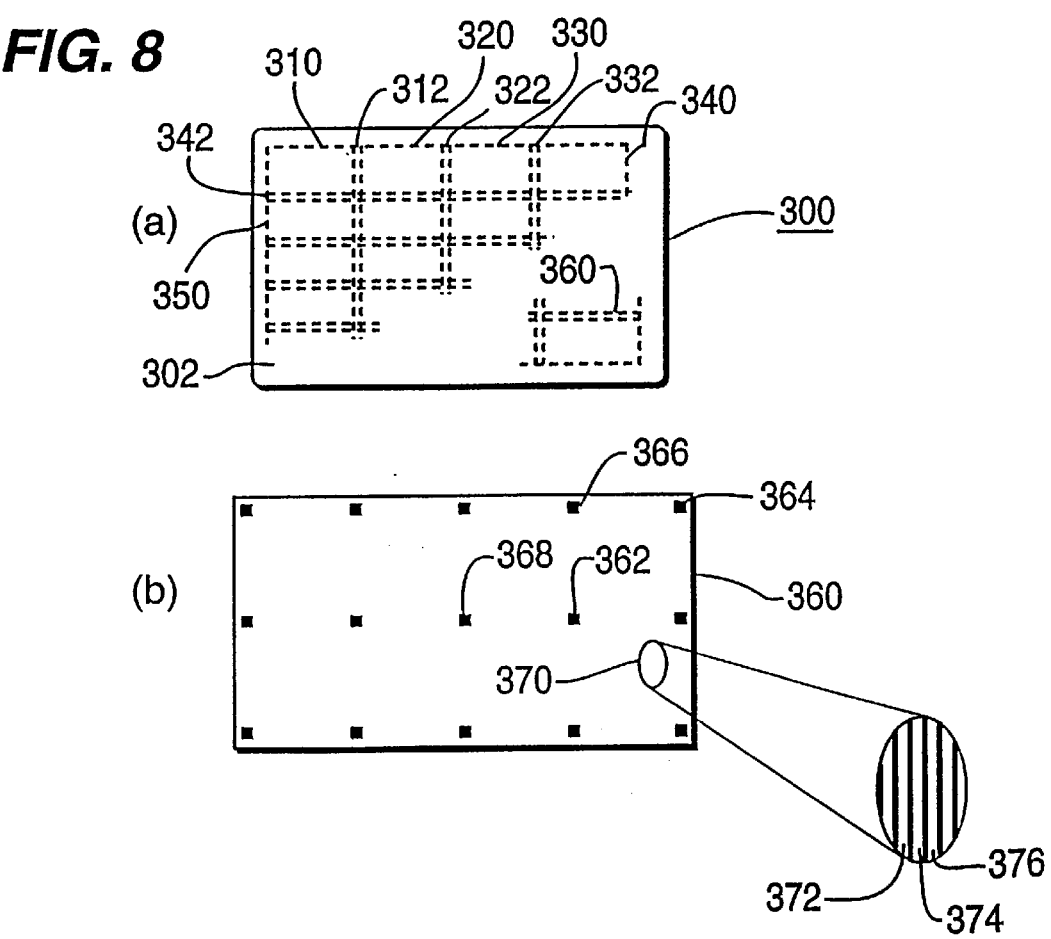
FIGS. 8(a) and 8(b) are diagrams showing front views of another alternative exemplary physical embodiment of an image generator usable with the embodiment of FIG. 2.
Figure 9:
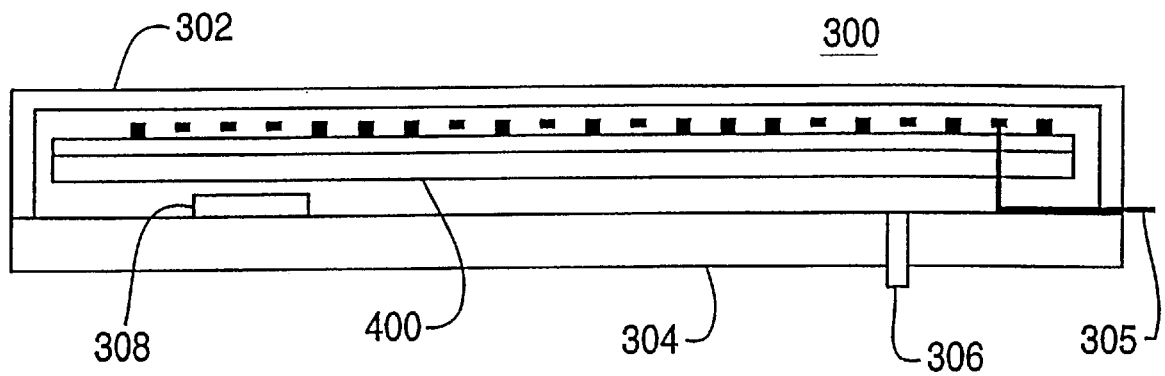
FIG. 9 is a cross-sectional view of the image generator of FIG. 8(a)
Figure 10:
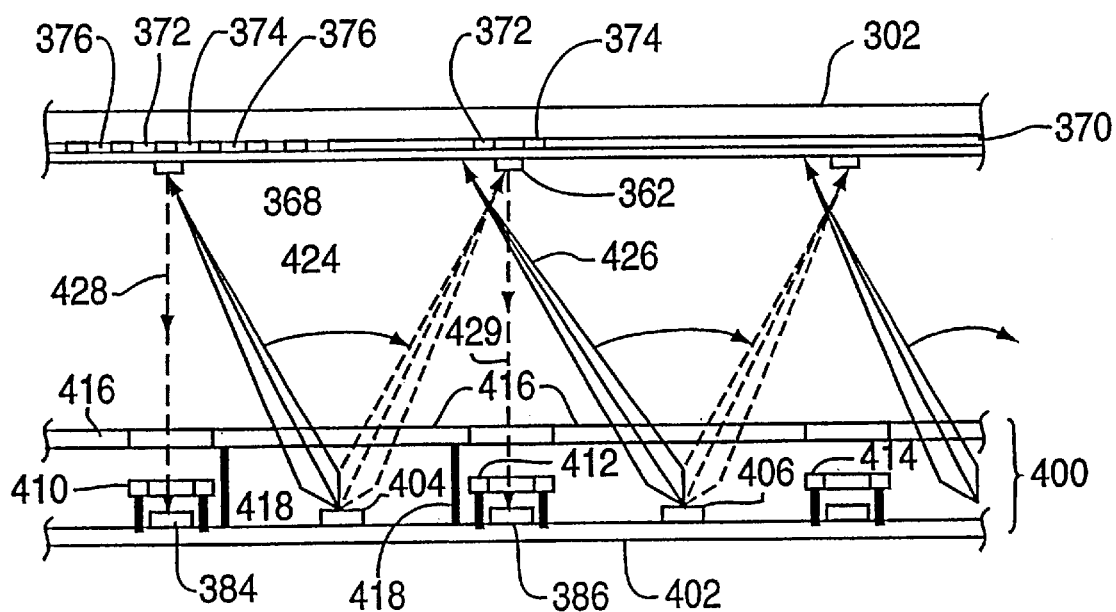
FIG. 10 is a cross-sectional view of a portion of the image generator of FIG. 8(b)

FIGS. 8–10 show a display system in which plural overlapping sub-images 310, 320, 330, 340, 350 . . . , 360 shown in FIG. 8(a) are produced on the faceplate 302 of a large unitary glass-front evacuated housing 300. A plurality of sub-image generators of sub-images 310–360 are located within housing 300 and may a include a plurality of cathodo-luminescent sources such as thermionic cathodes, semiconductor field emitters or other electron sources that project a large number of synchronously-scanned, modulated electron beams onto color (red, green, blue) phosphor elements, such as dots or stripes, on faceplate 302. Areas of overlap around the respective peripheries of sub-images 310, 320, 330, 340, 350 . . . , illustrated, for example, by the regions 312, 322, 332, 342 between dashed lines, include pixels that are combinations of the respective pixels generated by adjacent sub-image generators that have been digitally processed to together produce the true image pixels, as described above. Exemplary sub-image 360 is enlarged in FIG. 8(b) to show the relative locations of exemplary ultra-violet-light producing phosphor elements, illustrated as small black squares such as 362, 364, 366. Ultra-violet dots 362, 364, 366 . . . are employed as sensors for monitoring pixels in the areas of overlap of adjacent sub-images for setting and adjusting the registration and focus of the respective sub-images, and for synchronizing the scanning of the respective sub-image generators. Once the registration and scanning is adjusted, ultra-violet dots 362, 364, 366 . . . are employed as sensors for monitoring pixels in the areas of overlap of adjacent sub-images for setting and adjusting the brightness or pixel intensity of each sub-image and therefore the uniformity of the brightness and pixel intensity over the complete displayed image. Exemplary area 370 on faceplate 302 is enlarged to show an exemplary pattern of color phosphor stripes thereon, in particular, red stripe 372, green stripe 374 and blue stripe 376, each of which is separated from the adjacent stripes by a black stripe (i.e. the "black matrix" pattern) for improving contrast.

FIG. 9 shows a cross-section of vacuum enclosure housing 300 of FIG. 8(a) including a large area phosphor-striped glass CRT faceplate 302 attached by a frit vacuum seal 303 along its periphery to a structural backplane 304, whereby a 45-inch diagonal display having a resolution of 13 mega-pixels per square foot and a thickness of only about ten inches is provided. Smaller displays and lower pixel resolution displays may also be provided, and supports may be required for the inner surface of the glass screen for larger screen sizes. Electrical leads 305 are brought out of the vacuum enclosure 300 through the frit seal 303 in conventional manner. Housing 300 is evacuated by creating a vacuum on evacuation exhaust port 306 which passes through structural backplane 304. After housing 300 is evacuated, exhaust port 306 is sealed and any remaining gas molecules are absorbed by getter 308 in known manner. The plurality of image generators are mounted on image generator assembly 400 within housing 300 as is described below.

In FIG. 10, image generator assembly 400 includes a ceramic support rail 402 on which are mounted a plurality of electron sources, such as field emitter elements 404, 406 formed on respective semiconductor chips. Each field emitter element 404, 406 is flanked to the left and right by respective electrostatic horizontal focus/deflection plates 410, 412, 414 which respectively deflect the electron beams 424, 426 produced by the respective field emitter elements 404, 406 horizontally (e.g., left to right in FIG. 10). Electrostatic vertical focus/deflection plates, such as plate 416, are oriented orthogonally to horizontal focus/deflection plates 410, 412, 414 and also flank field emitter elements 404, 406 (e.g., plate 416 is below the plane of the paper in FIG. 10 and another vertical plate (not shown) is above such plane) and deflect the electron beams produced by the respective field emitter elements 404, 406 vertically, i.e. above and below the plane of the paper. In addition to the deflection signals applied to respective focus/deflection plates 410, 412, 414, 416 . . . a respective focus signal is applied thereto to adjust the focus of the beams of electrons 424, 424 generated by each field emitter element 404, 406, respectively, so that the electron beams each converge at a respective spot on the inner surface of screen 302, as is illustrated by converged electron beams 424 and 426.

All of the electron beams have areas of overlap scan with the adjacent scanned electron beams around the peripheries of the respective areas covered by each respective scanned electron beam, and preferably are scanned in synchronism. It is noted that the combined actions of field emitter element 404, horizontal and vertical focus/deflection plates 410, 412, 416 function as a lens that enlarges the sub-image generated by field emitter element 404 to produce on screen 302 an enlarged sub-image that overlaps the sub-image produced thereon by the adjacent, but not contiguous, field emitter element 406. The same is true for each of the field emitter elements and their associated horizontal and vertical deflection plates, as well as for the sub-images 310, 320 . . . of display 300.

Phosphor pattern 370 is on the inner surface of glass screen 302 and comprises repetitive sequences of color phosphor stripes thereon, for example, red stripe 372, green stripe 374 and blue stripe 376, each of which is separated from the adjacent stripes by a black stripe (i.e. the "black matrix" pattern) for improving contrast. As electron beams 424, 426 are scanned across the color phosphor stripes 372, 374, 376 of phosphor pattern 370 they are modulated with luminance and chrominance information representative of the individual pixels comprising the image displayed on screen 302 to produce such image thereon. Electron beams 424, 426 preferably raster-scan in synchronism between the edges of the respective sub-images they produce, as illustrated in FIG. 10 by solid lines and dashed lines, respectively, representing the beginning and end, respectively, of each beam's scan represented by the curved arrow therebetween.

Ultra-violet-emitting phosphor dots such as dots 362, 368 are located on the black stripes of phosphor pattern 370 for being illuminated by and for sensing and monitoring respective ones of the electron beams 424, 426 in the regions of screen 302 in which they (and the respective sub-images they produce) overlap. For a screen 302 that displays a 300×120 pixel sub-image, less than 100 UV phosphor dots 362, 368 distributed over the area of screen 302 are required to sufficiently measure the horizontal and vertical landing position data of the various electron beams. Preferably, UV phosphor dots 362, 368 are located on respective black stripes, for example, ones that separate a red phosphor stripe 372 from a green phosphor stripe 374. When illuminated by the electron beams 424, 426, UV phosphor dots 362, 368 emit UV light, such as UV light beams 428, 429 emitted by UV phosphor dots 368, 362, respectively, in response to electron beams 424, 426, which UV light beams 428, 429 in turn illuminate UV sensor chip 384 and 386, respectively. In like manner at the other end of the scan, exemplary electron beam 424 illuminates UV phosphor dot 362 which emits UV light 429 that impinges on UV sensor chip 386.

Variations in the landing position (registration), focus and intensity of the electron beams 424, 426 arise, for example, from chip-to-chip differences in the field emitter elements, physical placement tolerances for the field emitter elements and the horizontal and vertical deflection plates 410, 412, 414, 416 . . . Detection of electron beam 424 impinging on UV phosphor dots 368 and 362 enables UV sensor chips 384, 386, respectively, to signal the times thereof so the appropriate processor, such as image processors IP1–IP4, can synchronize the scanning and timing of all the electron beams and can further control the width and length of the scanning of each electron beam, as well as its registration, focus, and intensity, thereby creating each pixel of the image displayed, including those pixels produced by combining the sub-image pixels produced by plural image generators in the overlap areas, with its correct registration and intensity.

It is preferred that UV sensor chips 384, 386 and/or field emitter chips 404, 406 include or be associated with processor and memory devices that perform the aforementioned processing and corrections as well as the beam alignments described below to adjust or correct to a predetermined standard the characteristics of the sub-image produced by each field emitter element during operation of the image generators. UV sensor chips 384, 386 and/or field emitter chips 404, 406 may be fabricated to include processors and addressable memory on one or more semiconductor chips. The corrections calculated by the processor from the measured beam landing and timing information are stored in the addressable memory, such as in a look-up table, from which they are later retrieved to control the generation of the respective sub-images of the displayed image. Exemplary correction information stored in such addressable memory includes, for each field emitter element, the voltages to be applied for proper (i.e. predetermined standard) intensity characteristics, the columns of the field emitter arrays to be activated for proper horizontal beam positioning, the advancement or retardation of the column enabling pulse for proper vertical beam positioning within a row, and the voltages to be applied to the vertical and horizontal deflection plates for proper scanning synchronism and proper beam focus.

Figure 11:
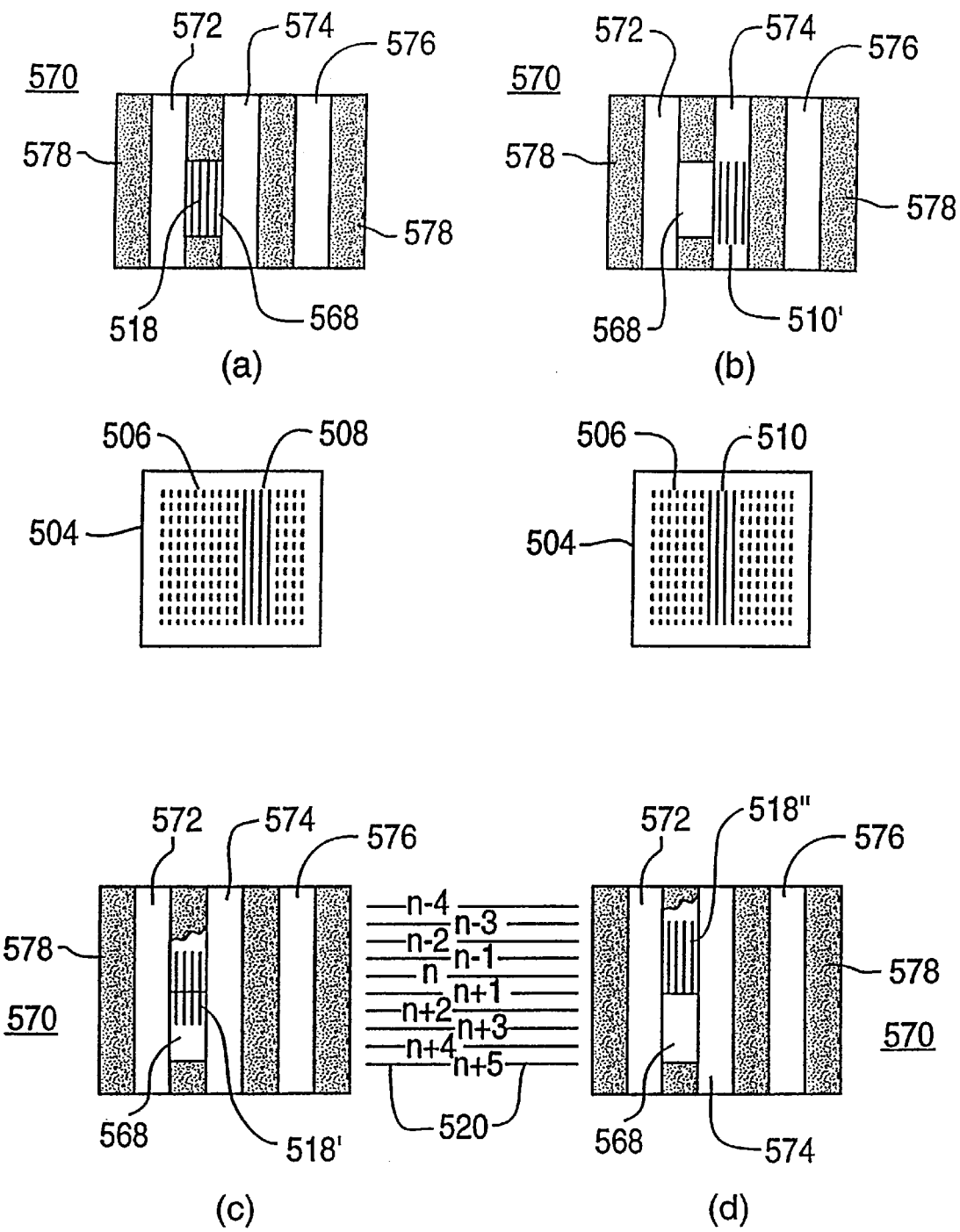
FIGS. 11(a), 11(b), 11(c) and 11(d) are detail diagrams relating to an image generator element of a sort useful in the image generator of FIG. 10.

One exemplary way in which the timing and landing accuracy (registration) of the respective electron beams is controlled is illustrated by FIGS. 11(*a*), 11(*b*), 11(*c*) and 11(*d*). A portion 570 of the color phosphor stripe pattern includes red stripe 572, green stripe 574 and blue stripe 576 with black non-phosphor stripes 578 therebetween. An exemplary UV-phosphor dot 568 of generally rectangular shape is on one of the black stripes 578. For a 10-mil by 10-mil (0.25×0.25 mm) square pixel, for example, typical for contemporary high-performance CRT monitors, each color phosphor stripe and each black matrix stripe is 1.67 mils wide and so a beam width of about 2.5±0.5 mil is required for each electron beam. An exemplary field emitter element in the form of semiconductor field emitter chip 504 includes an array 506 of addressable field emitting sites arranged in rows and columns, for example, in a 20×20 array with about 5 ìm center-to-center spacing of the individual field emitter sites. With a magnification of about two times in the deflection system, an image of the addressed columns having about a 10 ìm spacing is produced across the 1.67 mil (42 ìm) stripes. For this embodiment, the columns of field emitter chip 508 are addressed to select the column emitter sites that are to emit and all the rows thereof are simultaneously enabled (i.e. addressed) by a timing pulse for the time interval in which such emission is to occur. In FIG. 11(*a*), the field emitter sites in four adjacent columns 508 are addressed and thus emit respective electron beam lines that illuminate phosphor pattern 570 along four lines 518 which, if they impinge on UV phosphor dot 568 cause it to emit UV light. The magnitude of the emitted UV light intensity is proportional to the intensity of the electron beam illuminating phosphor dot 468, i.e. of the intensity of the electron beam and the degree to which it illuminates or misses phosphor dot 468. Thus, in the example of FIG. 11(*a*), the four lines 518 fall squarely on UV phosphor dot 568 and so the UV light produced is high.

Horizontal correction or adjustment of the electron beam landing (e.g., across the stripe direction) is controlled by selecting the columns of field emitter chip 504 that are caused to emit electrons. Thus in moving from the condition of FIG. 11(*a*) to that of FIG. 11(*b*), in which the four lines 518 are translated horizontally to the right as shown by four lines 518', that translation is effected by an address that unselects the four columns 508 of field emitter sites first addressed and instead addresses the four columns 510 to the left thereof. The columns selected can be varied in resolution of one column or more, as is appropriate to the desired horizontal movement of the landing point of the electron beam. Because the illumination of the UV phosphor dot 568 produces UV light that is proportional to the intensity of illumination, the spot size, and therefore the focus of the electron beams may be measured and adjusted by the respective image processors IP1–IP4 so that the spot size is both reduced to substantially correspond to one pixel, or the width of the color phosphor stripes 572, 574, 576.

Vertical correction or adjustment of the electron beam landing (e.g., along the stripe direction) is controlled by addressing field emitter chip 504 by changing the timing of the timing pulse signals that cause field emitter chip 504 to emit. In FIGS. 11(c) and 11(d) the horizontal lines 520 indicate time in cycles of the system clock signal, where the time "n" is the nominal time at which the rows of field emitter chip 504 would nominally be enabled to emit. The notation "n–x" indicates timing that is "x" clock cycles later than time "n" and "n–x" indicates timing that is "x" clock cycles prior thereto. Thus in moving from the condition of FIG. 11(a) to that of FIG. 11(c), in which the four emission lines 518 are translated vertically upward as shown by four lines 518', that translation is effected by changing the starting time of the row timing pulse from the time "n+1" to the earlier time "n–1" The emission lines 518" in FIG. 11(d) commence at time "n–3" and end at time "n+1" and so are further translated vertically upward from those of FIG. 11(c). In each of these examples, the row timing pulse is four clock cycles in duration, and the test measurements are preferably made with a checker-board test pattern displayed. For a 300×120 pixel sub-image that is refreshed at a 75 Hz rate, the pixel frequency is approximately 3 MHZ and so a clock frequency of 18 MHZ or higher is sufficient to attain a localized accuracy of less than about 0.167 pixel, and an accuracy of about 0.25 pixel across the screen 302 display area.

In addition, because the electron beams 424, 426 from adjacent field emitter elements 404, 406 in FIG. 10 both illuminate the same UV phosphor dots during their respective scans, the UV sensor 386 can measure the registration and intensity of the adjacent beams which can then be adjusted or corrected by image server 106 and the respective image processors IP1–IP4. Further, at each intersection of four sub-images in the area of overlap at their respective corners, the registration and intensity of the four electron beams can be measured and adjusted so that there is no visible remnant of a seam thereat. In this regard, image server 106 and the respective image processors IP1–IP4 further compute the proportionately reduced intensity required for each respective electron beam so that the combination of the intensities of the respective electron beams in the overlap areas is substantially the same as that of each electron beam at any point in its sub-image area. In other words, the beam intensities are adjusted so that each pixel in the displayed image, whether generated as a pixel of a sub-image generated by one image generator or as a combined pixel in the overlap regions of plural sub-images, has the same predetermined or nominal intensity, thereby providing a uniform intensity level over the entire area of the displayed image.

Figure 12:
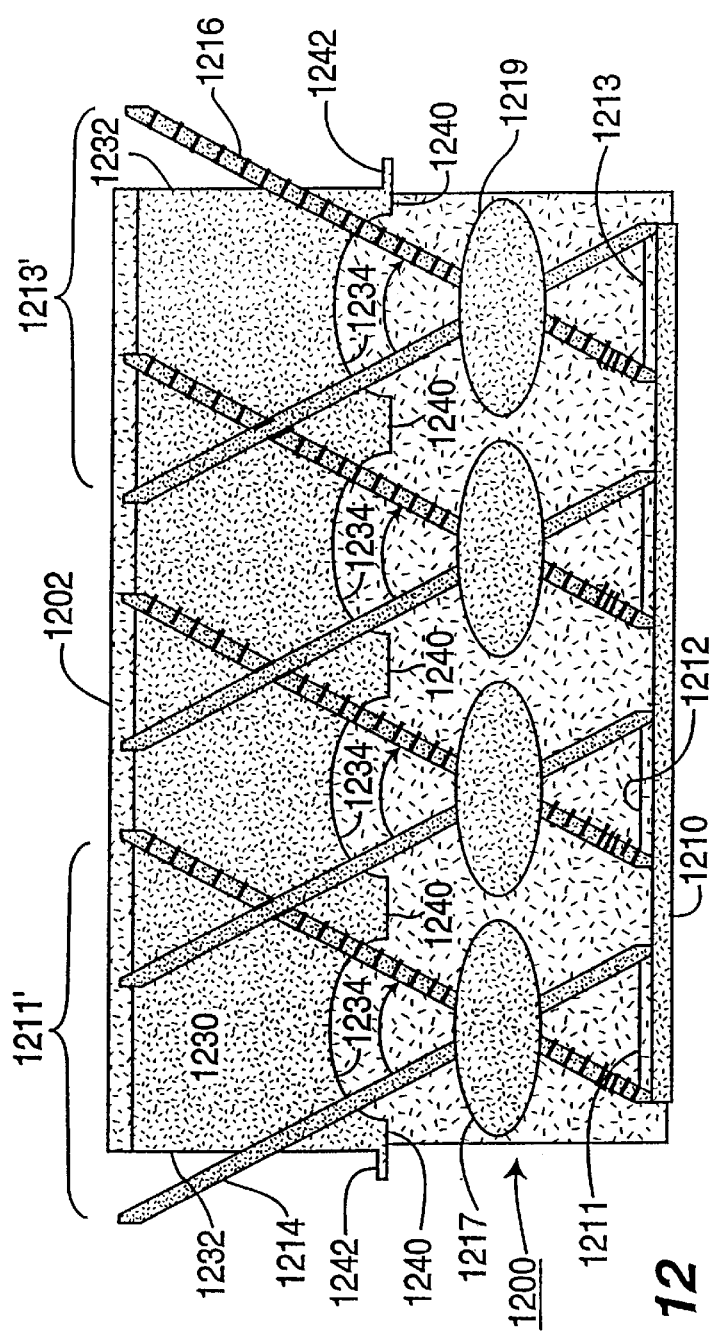
FIGS. 12 and 13 are cross-sectional diagrams of an alternative embodiment of an image generator of the sort shown in FIG. 3.
Figure 13:
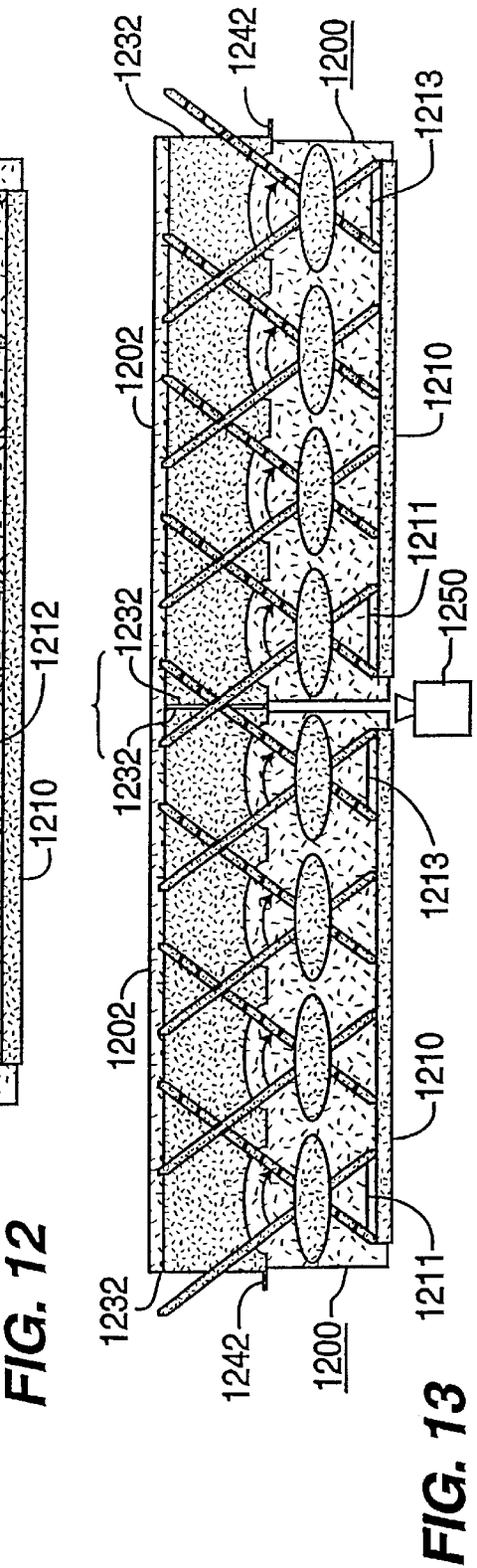

In the alternative image generator module 1200 of FIG. 12, an AMLCD panel image generator 1210 employs portions of its display as a plurality of adjacent non-contiguous sub-image generators 1211, . . . , 1213 that generate in conjunction with lenses 1217, . . . , 1219 a plurality of overlapping sub-images 1211', . . . , 1213' on display screen 1202. Image generator module 1200 is similar to and operates in like manner to image generators 110, 120 shown in FIG. 3 and described above. Image generator module 1200 differs in that it includes a thick optical structure 1230 through which light beams 1214, . . . , 1216 pass in illuminating screen 1202 with their respective sub-images. Image generator module 1200 has several advantages and features, not the least of which is that it is a truly modular image generator that can be assembled side-by-side with other like modules 1200, as shown in FIG. 13, in the field as well as in the factory or service center, to display seamless images. In addition, the arrangement of module 1200 provides places where supports for the screen may be placed without detracting from the image and facilitates the sensing of displayed image pixels from the rear.

To this end, optical structure 1230 has substantial thickness and has at each of its edges an optical surface 1232 that is substantially perpendicular to the plane of screen 1202 so that when placed side-by-side abutting a like module with an optical gel or adhesive material filling any voids therebetween, light beams from the adjacent modules pass through the optical interface formed by surface 1232 with insignificant reflection, refraction or distortion, thereby to preserve the overlapping sub-image arrangement with respect to abutting modules 1200.

Conveniently, portions of the bottom surface of optical structure 1230 through which light beams 1214, . . . 1216 do not pass may be at least in part formed as flat optical surfaces 1240 lying in one or more planes that are parallel to that of screen 1202. Optical surfaces 1240 provide "windows" to screen 1202 through which the pixels displayed thereon may be monitored, such as by sensors 1250 which may be located behind modules 1200 as shown or which may be embedded into modules 1200. Specifically, pixels in the overlap areas of adjacent sub-images (whether generated by adjacent image generator modules 1200 or by adjacent sub-image generators 1211, 1212, . . . 1213 on a single module 1200) may be sensed from the back of the image generator module, thereby permitting set up and calibration of a multi-module display, as well as operational adjustments thereto, to be made from the rear and without interfering with or interrupting the display of images to an audience. Flat surfaces 1240 along the edges of module 1200, may conveniently include tabs and slots 1242 or other alignment and/or attachment features for facilitating the alignment and/or attachment of adjacent modules 1200 into a multi-module display. In addition, and perhaps more importantly, ones of surfaces 1240 not used as windows for sensing pixels produced on screen 1202 may be employed for bearing locations for supporting members positioned between screen 1202 and panel 1210 as would be desirable for large display screens, for example, displays exceeding four feet along any edge.

To the end of sensing or monitoring the pixels in the regions of overlap of various sub-images, sensor 1250, which may be a CCD camera as previously described or simply a CCD sensor chip, is located behind screen 1202 of image generator modules 1200 to view, for example, selected regions of sub-image 1211', 1213' overlap. Sensor 1250 is coupled to the image processor IP1–IP4 that controls image generator module 1200 in the manner as previously described, to produce seamless images on screen 1202. Sensor 1250 may be built into module 1200 or be a separate device. It is preferred that one or more sensors 1250 be incorporated into each image generator module 1200 for sensing pixels in various regions of overlapping sub-images produced thereby, and in addition that one or more sensors 1250 be incorporated into each image generator module 1200 for sensing pixels in various regions of the sub-images produced thereby other than the regions of overlapping sub-images. It is further preferred that each module 1200 include electronic circuitry such as non-volatile memory in which its set up and calibration parameters may be stored, and from which such parameters may be readily accessed by the appropriate image processor IP1–IP4 for facilitating the combining of modules into a multi-module display that displays seamless images. The parameters stored in such memory include, for example, correction factors that when applied to image data to be applied to the image generator 1200, render its response to be that of a predetermined standard despite the physical tolerances and electrical tolerances of the elements that comprise such module 1200. Further, the surfaces 1240 provide locations at which screen 1202 may be supported, such as by a member attached between and to surface 1240 and panel 1210. Because surface 1240 is not in the field of view of the image generators 1211, 1212, . . . , the addition of support such members does not affect the image quality.

Preferably, optical structure 1230 further includes on the rear surface thereof arcuate interface surfaces 1234 through which the light beams 1214, . . . , 1216 pass in entering optical structure 1230. Arcuate surfaces 1234 are preferably formed in a generally spherical shape so that light beams 1214, . . . , 1216 pass substantially perpendicular to the surface 1234 to enter optical structure 1230 with insignificant reflection, refraction or distortion. Arcuate surfaces 1234 may be shaped so as to provide unity magnification or a greater magnification.

Figure 14:
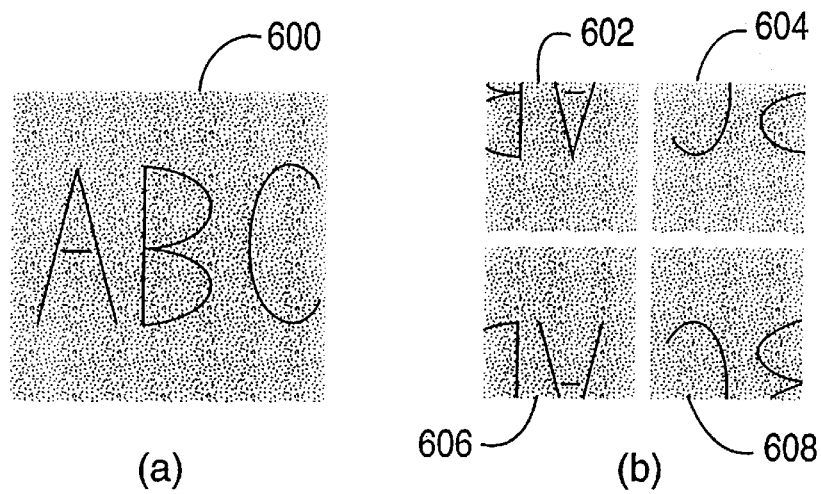
FIGS. 14(a) and 14(b) are diagrams of an image and sub-images in relation to the image generators of FIGS. 4 and 12.

It is apparent from FIG. 12 as from FIG. 4 that images in image generators of the sort shown therein invert an image from the image generator to the display screen as a result of the operation of their respective lenses. FIG. 14(*a*) is an image 600 produced on a display screen such as display screen 102 or 1202, which image is comprised, for example, of a 2×2 array of four sub-images 602, 604, 606, 608 as shown in FIG. 14(*b*). Because of the inversion produced by the lens, such as lens 117, 118, 119 or 1217, 1218, 1219, each sub-image is itself inverted or "flipped" where it is generated. Each inverted sub-image 602, 604, 606, 608 is inverted top-to-bottom and right-to-left by the lenses. For example, the bottom and right edges of upper left-hand sub-image 602 respectively become the left half of the top edge and the upper half of the left edge of image 600. The top edge of sub-image 602 overlaps the bottom edge of sub-image 606 in a rectangular region located mid way between the top and bottom edges of image 600 and in the left half thereof. The fact of sub-image overlap is seen in that sub-images 602 and 606 both include the cross-bar of the letter "A" and the cusp of the letter "B". Sub-image data inversion is performed in image processors IP1, IP2, . . . such as by transformation filters that bitmap the pixel data of each sub-image into an addressable random access memory and then read out the pixel data in reverse order, both horizontally and vertically. Combination of pixel data for regions of overlap may be performed as pixel data for such regions are produced from the transformation filters, such as by combining sub-image data with appropriate weighting or correction factors. Proportional weighting may be employed, as may weighting based upon intensity characteristics and/or position of the respective pixels, whether for individual pixels or for pixels in a neighborhood of pixels.

Figure 15:
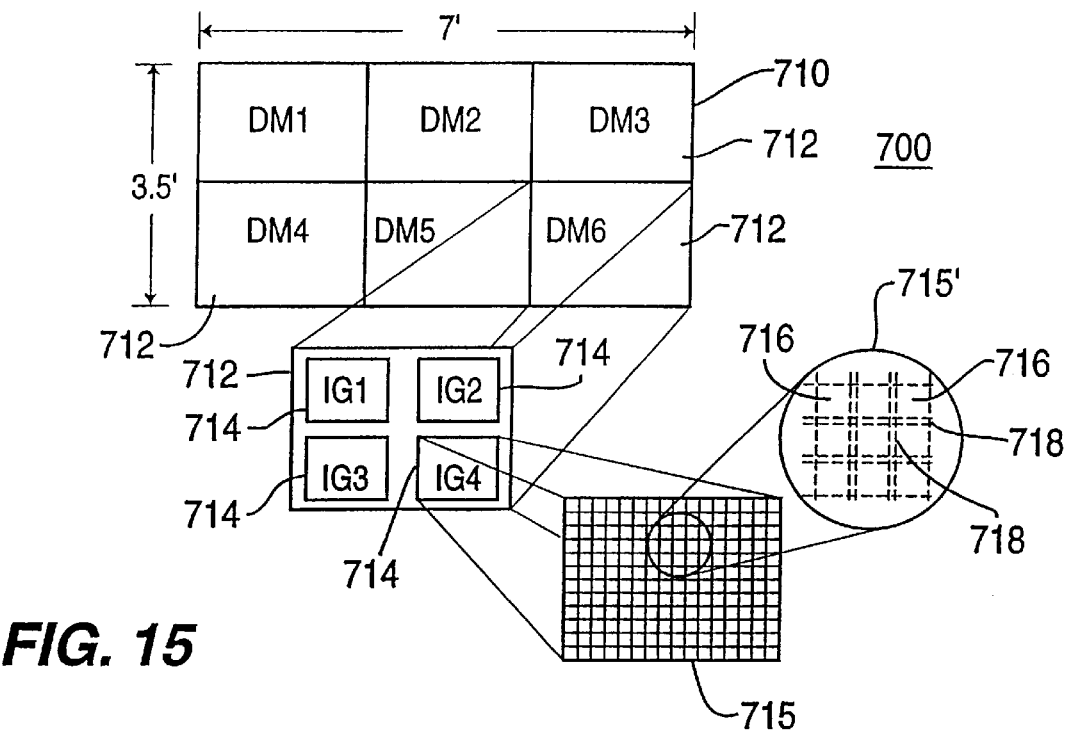
FIGS. 15 and 16 are diagrammatic representations of an embodiment of a modular display system according to the present invention.

FIG. 15 shows a modular display system 700 according to the present invention in a multiply-exploded representation to illustrate the formation of a displayed image on display screen 710. Display system 700 includes a display device or screen 710 that is, for example, 3.5 feet high and 7 feet wide, and is formed by six display modules 712 arrayed in contiguous edge-to-edge arrangement. The display modules 712 are designated DM1, DM2, DM3, . . . , DM6. Each display module includes, for example, four image generators 714 designated as IG1, IG2, IG3, IG4, each of which includes, for example, an active matrix liquid crystal display (AMLCD) panel that is adjacent to but need not be contiguous with an adjacent image generator A projection image 715 illustrates the combined sub-images formed by various ones of portions of the AMLCD panel of the image generator 714, which portions are adjacent but need not be contiguous. Expanded portion 715' of projected image 715 illustrates plural overlapping sub-images 716 and their overlap regions 718, all in similar fashion to that described above in relation to FIGS. 4 and 8(*a*)–8(*b*), for example.

Figure 16:
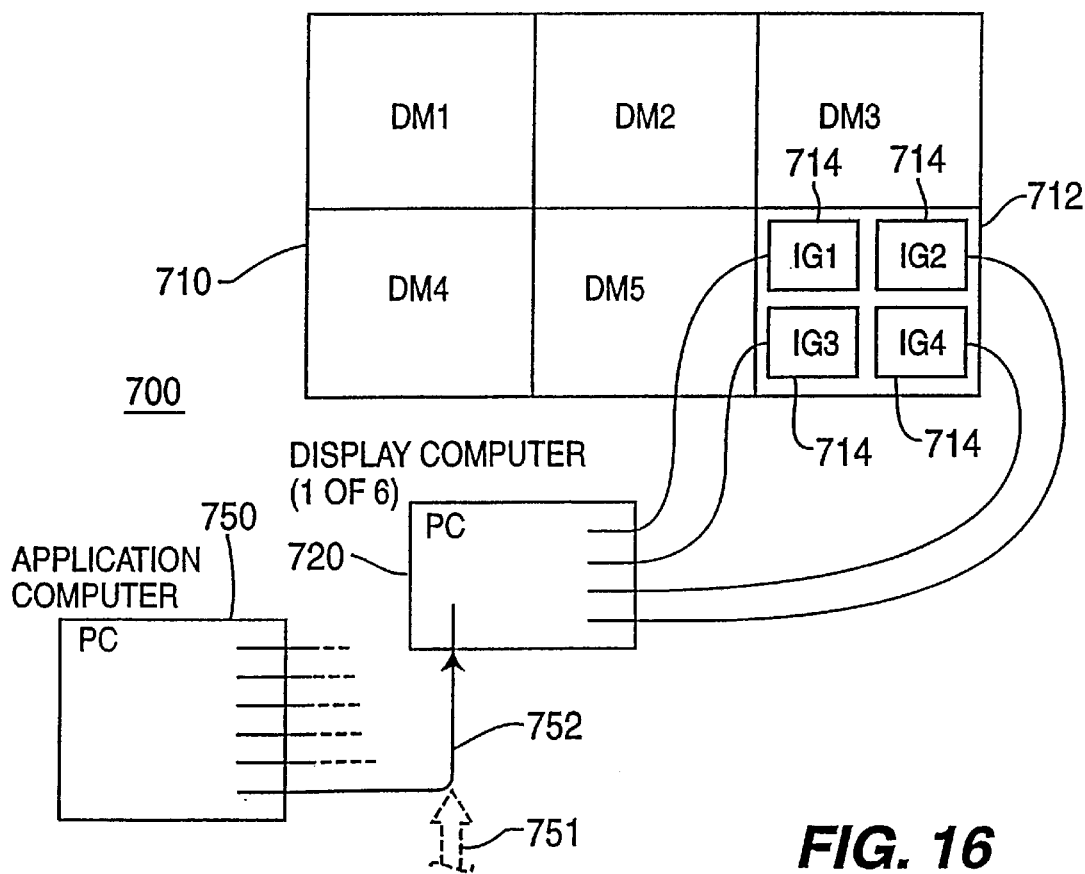

Each display module 712 includes an associated image processor, such as display computer 720, as illustrated in FIG. 16. Therein, an image to be displayed, i.e. a "source image," is provided from an image server, such as application computer 750, via a data bus 752, preferably a digital data bus, to the six respective image processors 720 associated with each of the six display modules DM1, DM2, . . . , DM6. Each display computer receives and processes the image data for the portion of the image, i.e. the sub-images, to be displayed by its associated image generators 714 and provides processed sub-image data to the respective image generators IG1, IG2, . . .

Figure 17:
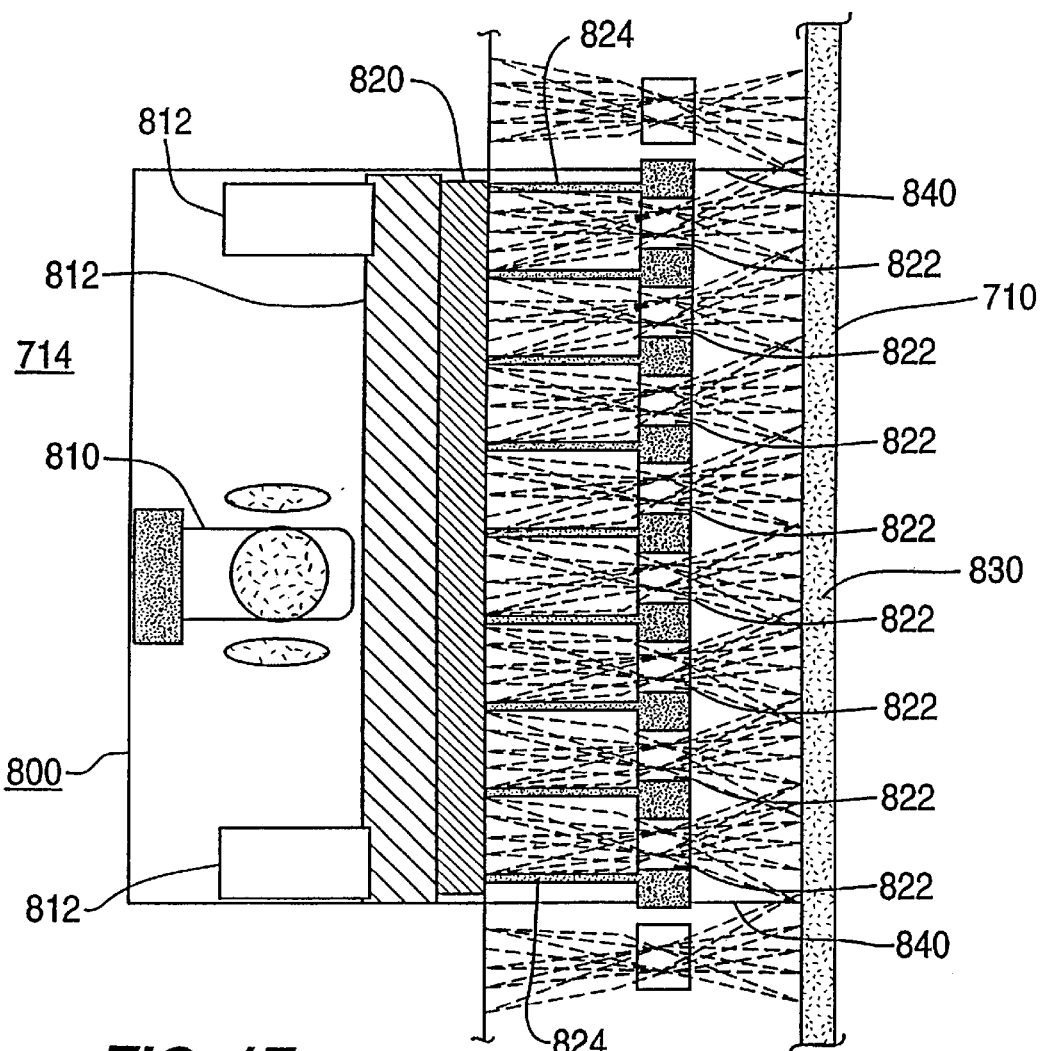
FIG. 17 is a cross-sectional diagram of a high-brightness image generator relating to the embodiment of FIGS. 15 and 16.

FIG. 17 is an exemplary image generator 800 of a sort that can be employed as image generators 714 in the display modules 712 of display system 700 of FIGS. 15 and 16. Adjacent but not contiguous sub-images are formed on a display panel 820, such as an AMLCD panel, and are projected onto a module screen 830. To that end, a light source 810, such as a high-intensity metal halide lamp provides light that is directed, distributed and collimated by light distributors 812, 814 to impinge on the back surface of AMLCD panel 820. Light passing through AMLCD panel 820 in accordance with the sub-images formed thereon (as illustrated by the broken lines therebetween), is responsive to the processed sub-image data from the associated image processor 720 and is projected via respective lenses 822 onto module screen 830 which, with the screens of adjacent display modules 800, form display screen 710. Each lens 722 is preferably a three-lens combination that has a magnification greater than unity so that the adjacent non-contiguous sub-images formed on panel 820 are projected onto screen 830 as contiguous overlapping sub-images. Lenses 822 are supported by support baffles 824 that also serve to baffle the light from any given sub-image from reflecting or scattering into that of another sub-image. Support baffles 824 are preferably arranged in an "egg-crate" configuration.

A large screen display system 700 may be constructed of a number M×N display modules 712 that each have a resolution of 470,000 pixels per square foot. Each of the four image generators 714 thereof preferably employs a 17-inch diagonal XGA AMLCD panel of the sort employed in computer displays to produce displayed pixels that are about 450 micron square, and the useful resolution of each AMLCD panel is about 800×600 pixels in a SVGA system. The projection lens system of each image generator 714 employs a 12×16 array of lenses (i.e. lens assemblies) for each AMLCD panel, and each lens assembly may employ three plastic and one Fresnel lens, to have about a 29-degree field of view and low distortion, e.g., <13%. A 50-Watt metal halide back-light source will produce brightness levels of about 50 fL at the screen without polarization recovery and will provide about 80 fL at the screen with polarization recovery. Each display module has a screen size of about 28 inches wide by 21 inches high, and is about 11 inches thick. Thus, a 2×3 array of six modules 712 provides a display screen 710 that is about 3.5 feet high×7 feet wide. A 17-inch LCD panel type LM18X94 is available from Sharp Corporation located in Japan.

In addition, each image generator 800 may also be employed as a display module. To this end, image generator module 800 includes on its edges surrounding module screen 830 flat optical surfaces 840 that are substantially perpendicular to screen 830. When image generator module 800 is placed adjacent to and abutting another like module with their respective screens 830 in substantially the same plane, light passes through the respective abutting optical surfaces 840. Preferably, an optical filler material, such as Cargill's #5040 optical adhesive available from Cargill located in Cedar Grove, N.J. or Morland's #61 optical adhesive available from Edmund Scientific located in Barrington, N.J., fills any voids between abutting optical surfaces 840 to form an optical interface between the abutting modules 800 that has low reflective losses and little refractive distortion. In this manner, sub-images formed on adjacent non-contiguous portions of respective adjacent non-contiguous image generators, such as adjacent non-contiguous AMLCD panels 820, are projected onto screen 710 as overlapping sub-images.

Figure 18:
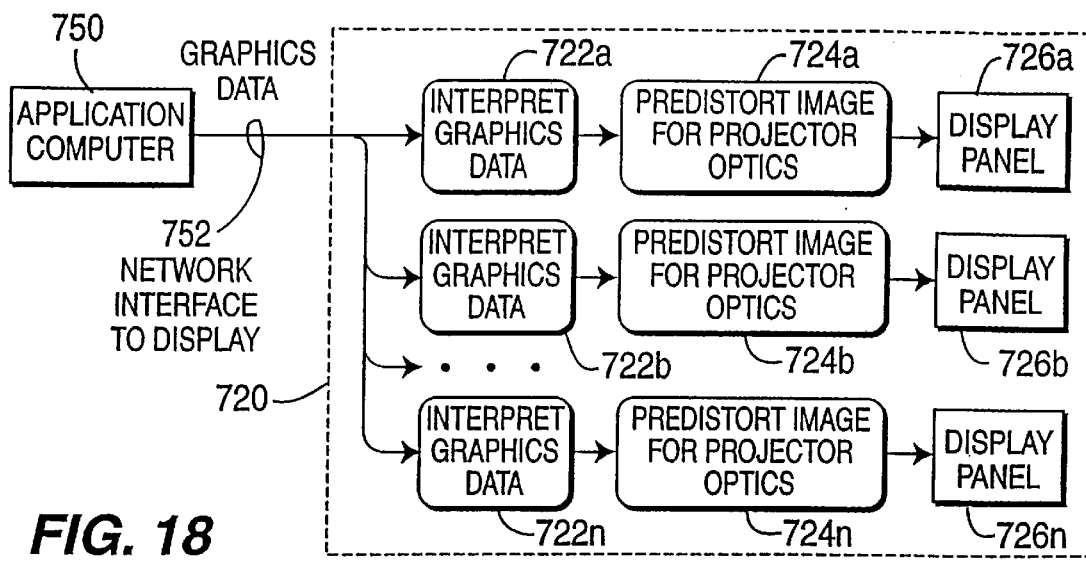
FIG. 18 is a schematic block flow diagram relating to the embodiment of FIGS. 15 and 16.

FIG. 18 is a schematic block flow diagram of image server 750 and image processor 720 relating to the display system 700 shown in FIGS. 15 and 16. Interface computer or image server 750 for the display system 700 sends source image data and operator graphics commands via digital data bus 752 to all the image processor computers 720 (only one is shown) networked within display system 700, however, each computer will only process the subset of data relating to the particular sub-images displayed on the image generator panel 714 with which it is associated. Processor 720 includes parallel processing to interpret graphics commands and process sub-image data for only the respective sub-images or portions of the displayed image that its associated display panel 714 generates. Processor 720 processes in parallel 722a, 722b, . . . 722n to interpret the graphics and sub-image data, processes in parallel 724a, 724b, . . . 724n to apply the appropriate correction functions with the sub-image data to compensate for differing brightness levels, registration and focus between image generators and within each image generator, including the pre-distorting and flipping of the sub-images as described above in relation to FIG. 14. The processed sub-image data resulting therefrom is applied to the respective AMLCD display panels 714.

Alternatively, application computer 750 may be replaced by a direct connection to an Ethernet or other network 751, and the functions performed by application computer 750 as described above may be performed by the respective display computers 720, as is illustrated by the network data bus 751' connecting to data bus 752 shown in phantom in FIG. 16, as may be desirable where a modular display system 700 having identical modules DM1, . . . DM6 is desired. In this embodiment, each display module (including a display computer 720 and image generators IG1, . . . IG4) determines the portion of the image data that it will accept and respond to. Image data received via Ethernet or other network 751 is applied via data bus 752 to display processors 720, each of which selects and accepts those portions of such image data that it can utilize to generate its respective portion of the sub-images, for example, by reading and acting upon the header data and control data included in the information packets containing image data sent via network 751, 752.

Figure 19:
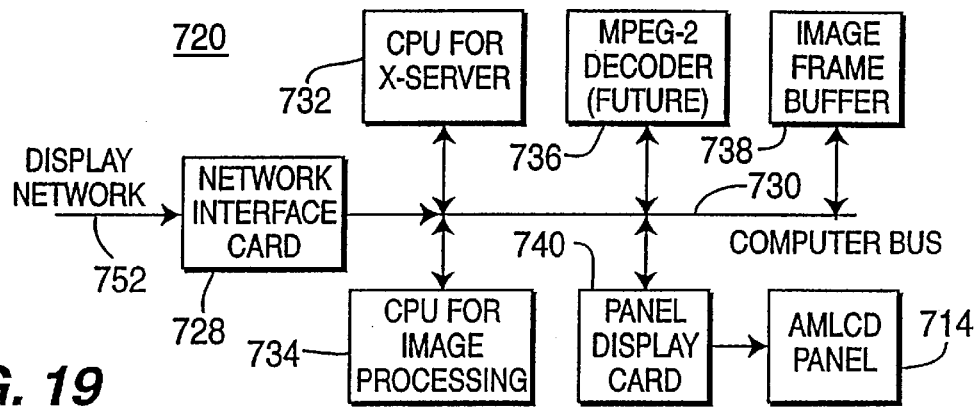
FIG. 19 is a schematic block diagram relating to the flow diagram of FIG. 18.

FIG. 19 is a schematic diagram of the computing hardware associated with each display panel in relation to the flow diagram of FIG. 18. Source image data is received by network interface 728 as digital graphic data via digital data bus 752, which is preferably an Ethernet, LAN or like network data system. Preferably, the sub-image data is "graphic data" sent to the display processor 720 over network 752 using the industry-standard X-Window System software that is commercially available from X-Consortium, Inc., located in Cambridge, Mass. and is compatible with most ANSI-C and POSIX compliant systems and so runs on a wide range of computing and graphics machines and other platforms. Each processor 720 interprets the sub-image data to construct therefrom display bitmaps for the individual display panels 714. By using high-level descriptions, such as X-Window descriptions, of the displayed image, the bandwidth required of the data network between the image server 750 and the display processor 720 can be kept to data rates consistent with a standard Ethernet and like networks, and still support high update rates and multiple windows of the displayed image on a multi-megapixel display, including overlapping hierarchical subwindows and intermingled text-and-graphics operations, on both monochrome and color displays. A further feature of the X-Window System enables operators to communicate with the display system 700 in terms of the logical size of the displayed image or windowed images therein, without regard to the physical partitioning of the images and processors among individual Image generators 714 or modules 712.

X-Window System graphics commands and image data received via network 752 and network interface 728 are interpreted in X-server CPU 732, which writes sub-image data bitmaps to the image frame buffer 738. In addition, compressed video received over the network 752 is decoded in a special-purpose MPEG-2 decoder which also writes sub-image data bitmaps to image frame buffer 738. Image processor CPU 734 reads the sub-image data bitmap from image frame buffer 738 and generates an LCD-panel compatible sub-image bitmap which it stores in panel display card 740, so that the LCD panel 820 produces the required sub-image optical input to accurately reproduce the overlapping sub-images on display screen 710. For each sub-image pixel, image processing CPU 734 fetches the values of contributing image pixels from image frame buffer 738 and computes a weighted average thereof. The weights employed depend upon the location of the pixel in the sub-image and upon the location of the sub-image on the display panel 714, and are generated from display-module coefficients pre-stored in look-up tables in the memory of CPU 734. The coefficients to correct for variability from sub-image to sub-image and from display panel to display panel will be set to obtain predetermined standardized image characteristics during the fabrication and calibration of each display module and/or image generator, or perhaps during subsequent recalibration or adjustment in the field. Within image processor 720, sub-image data, bitmaps, control signals and the like are sent and received via digital data bus 730.

The complexity of the image processing required of processor 720 can be estimated as follows. Assuming that for each color, and for each pixel in the bitmap for each image generator, inputs from a 2×2 pixel "neighborhood" of pixels in the image bitmap are required. Based on the location of a particular pixel in a display panel, the processor must look-up the address of one corner of the sub-image pixel block, and fetch that value as well as the values of the neighboring pixels. Weights must also be fetched from a pre-computed look-up table stored in memory, and the weighted sum of the image pixel values be computed for the neighborhood of pixels. Approximately 30 clock cycles are estimated to determine the value for each color for each pixel, or about 100 cycles are required for each set of RGB values of a given pixel. Assuming further each AMLCD display panel makes use of about 90% of its 800×600 pixels, about 43 million clock cycles are required for each display panel update. Thus, a 300 MHZ Pentium® processor can be expected to support an update rate of 7 Hz for the complete image. While this rate is satisfactory for high-resolution map and terrain data, text windows or video conferencing, it is too slow for displaying video images, for example at an update rate of 30 Hz. Thus, for video, a 650 MHZ Pentium® processor and a more efficient 50 clock cycles per RGB pixel set algorithm is required, or alternatively, four 300–400 MHZ Pentium® processors operating in parallel. The data rate of the network 752 can be reduced and the processing power required of image processors can be reduced by partitioning the processors so that a greater number of processors are employed and each processor is associated with a lesser number of sub-images. The computational requirements for correction of image distortion and for determining pixel values in the overlap regions of the sub-image cells, may be satisfied by multimedia graphics cards or chip sets, such as type Jeronimo J3 available from Appian Graphics located in Redmond, Wash. Similarly, 400 MHZ microprocessors on dual Pentium® II processor custom ATX computer motherboards of the 686MBDK series are available from the Industrial Computer Source located in San Diego, Calif.

Figure 20:
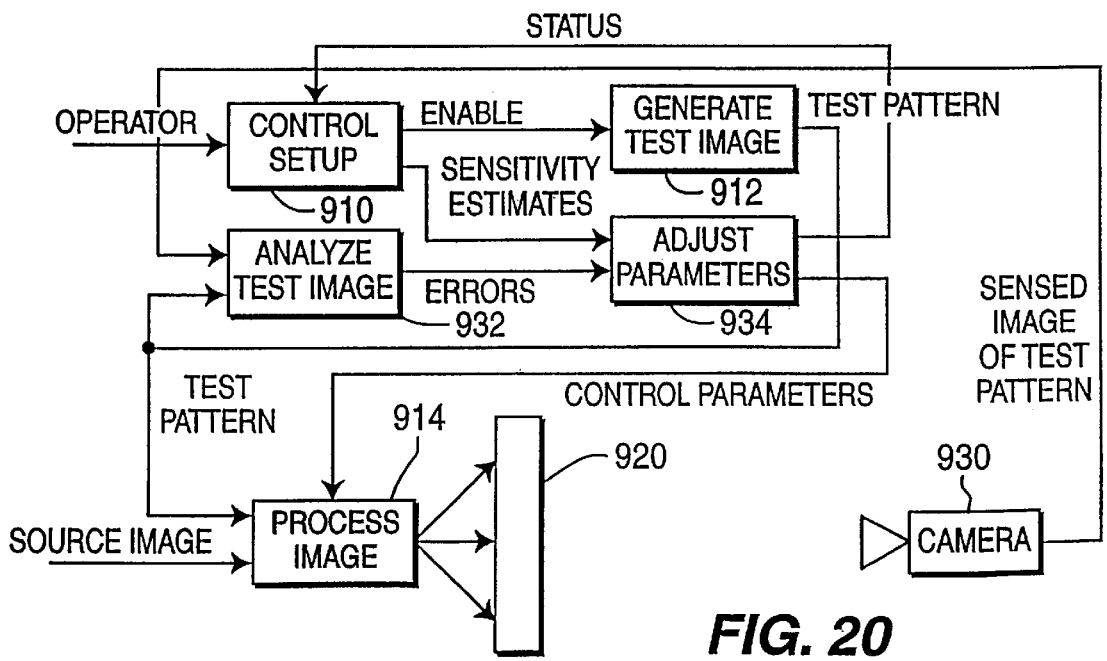
FIG. 20 is a schematic block flow diagram relating to the embodiment of FIGS. 15 and 16.

FIG. 20 is a schematic block flow diagram relating to the set up and calibration of the embodiment of display system 700 shown FIGS. 15 and 16. An operator, or an automated control, initiates the alignment operation by commanding control set-up 910 to perform an alignment and, if desired, specifying the predetermined standardized performance characteristics that are to be obtained. Control set-up 910 enables the generation of a test image 912 which is digital image data representing a test pattern, or a sequence of test patterns, that are to be displayed on screen 920. Generator 912 initiates this by (1) applying the test image data to image processor 914 that generates the aforementioned test image and (2) supplying initial or estimated correction factor values to a parameter adjuster 934. The test image is sensed 930, as by a CCD camera or other sensor, and is analyzed 932 with reference to the generated test image 912 to determine errors therebetween. Errors are employed to adjust the parameters 934 provided to image processor 914 thereby to adjust the displayed 920 test image. The process repeats iteratively until correction or appropriate weighting factors are determined for each pixel and are transferred to image processor 914 and to control set-up 910. During the alignment process, image processor 914 blocks source image data from being utilized to generate a displayed image 920 unless it is desired by the operator to observe the displayed source image, as is beneficial for a subjective evaluation.

While the present invention has been described in terms of the foregoing exemplary embodiments, variations within the scope and spirit of the present invention as defined by the claims following will be apparent to those skilled in the art. For example, display systems of greater or fewer number of display modules or image generators than shown in the exemplary embodiments herein may be constructed in accordance with the principles of the present invention.

In addition, while the display module 300 of FIG. 8(a) is described as a unitary glass enclosure with plural sub-images 310, 320, . . . generated thereon, it is satisfactory that the cathodo-luminescent image generators be packaged as separate glass-enclosed modules 310, 320, . . . that generate respective sub-images and that are stacked abutting other like modules to form an image of overlapping sub-images in a substantially larger display system.

Further, while a flat-faced glass screen 302 is illustrated in FIG. 9, the thickness of the glass required to resist excessive inward deflection, and possibly breakage, of screen 302 may render its weight to be excessive for certain applications, such as a flat display that can be hung on the wall of a residence. In such application, the screen diagonal for a flat screen may be limited to 32–35 inches rather than 45 inches, however, displays of 35–45 inches and larger diagonal may employ curved glass screens with corresponding adjustment of the internal emitter element array and the horizontal and vertical deflection/focus plates and the structural backplate. For example, a curved mounting assembly, including curved deflection/focus plates and a curved array of field emitter elements can be employed. Where a cylindrically curved screen is desired for a display system of the sort shown in FIGS. 15–17, for example, the matrix of lenses 822 will have differing focal lengths to compensate for the differing distance between the sub-image-generating portions of the AMLCD panel 820 and the cylindrical screen 830 surface.

Still further, thermionic electron sources may be employed in place of the field emitter arrays 404, 406 to generate electron beams 424, 426 in the image generator 300 of FIGS. 9 and 10. In such case, horizontal landing position (registration) of the electron beams 424, 426 can be controlled and adjusted by applying respective small offset voltages to the horizontal deflection plates 410, 412, 414 or to an additional secondary control grid electrode. In addition, other image generators, such as light emitting diodes and arrays thereof, field emission displays and arrays thereof, cathode ray tubes, and electro-luminescent displays may be employed in the embodiments according to the present invention disclosed herein.

Alternatively, the rear surface of optical structure 1230 of FIGS. 12 and 13 may be flat and not include arcuate surfaces 1234 while still providing flat surfaces 1240 for the placement of supports for optical structure 1230 or for sensing pixels on screen 1202, or both. It is noted that the lenses 1217, . . . 1219 of FIGS. 12 and 13, as well as lenses 117, . . . 119 of FIGS. 3 and 4 and lenses 822 of FIG. 17, may be either Simple lenses or assemblies of plural lenses and other optical elements.

What is claimed is:

1. A display system for displaying a source image having a plurality of pixels in predetermined positions, said system comprising:
    a screen;
    at least two image generators generating overlapping adjacent portions of the source image on said screen, wherein the overlapping adjacent portions of the source image overlap and wherein unadjusted pixels of the overlapping adjacent portions of the image need not correspond to the pixels of the source image in position and/or intensity; and
    an image processor providing source image data to said image generators including pixel data representative of particular pixels of the source image in the overlap that are adjusted for position and intensity so that the respective pixels generated in the overlap by said two image generators combine to form on said screen the particular pixels of the source image at the predetermined positions of the source image.

2. The display system of claim 1 wherein said image generator generates a beam of light illuminating said screen and wherein said screen is a distributor of light.

3. The display system of claim 2 wherein said image generator is selected from the group consisting of an optical projector and a liquid crystal display having a source of light.

4. The display system of claim 1 wherein said image generator generates a beam of electrons illuminating said screen and wherein said screen includes elements responsive to said electrons to generate light.

5. The display system of claim 4 wherein said image generator includes a plurality of one of field emission elements and thermionic electron sources.

6. The display system of claim 4 wherein said beam of electrons is electrostatically scanned across said screen.

7. The display system of claim 1 wherein said image processor adjusts the pixel data by apportioning at least a given characteristic of the particular pixel to the respective pixels generated by each respective image generator.

8. The display system of claim 7 wherein said given characteristic of the particular pixel includes at least one of pixel brightness and pixel position.

9. The display system of claim 1 wherein said image processor adjusts the pixel data of particular pixels generated by said two image generators that are not in the overlap.

10. The display system of claim 1 further comprising a sensor positioned for sensing at least pixels in the image overlap and wherein said image processor is responsive to said sensor for adjusting the pixel data representative of particular pixels at least in the image overlap.

11. The display system of claim 10 wherein said sensor and said image generator are both located on one side of said screen.

12. The display system of claim 11 wherein said screen includes an emitter material responsive to the intensity of a beam of electrons produced by said image generator, and wherein said sensor is responsive to emission from said emitter material.

13. The display system of claim 12 wherein said emitter material is an ultra-violet emitting phosphor and wherein said sensor is responsive to ultra-violet radiation.

14. The display system of claim 5 wherein said image generator includes an addressable array of field emitters.

15. The display system of claim 14 wherein said image processor addresses selected ones of said addressable array of field emitters for positioning said beam of electrons illuminating said screen.

16. The display system of claim 15 wherein said image processor addresses said selected ones of said addressable array of field emitters for said positioning said beam of electrons on said screen in one of a vertical direction and a horizontal direction.

17. The display system of claim 15 wherein said image processor addresses said selected ones of said addressable array of field emitters by changing the times at which all of said selected ones of said addressable array of field emitters are addressed.

18. The display system of claim 1 further comprising a plurality of said image generators, wherein each of said plurality of image generators generates at least one beam illuminating said screen, and wherein the respective beams generated by all of said plurality of image generators are scanned on said screen in synchronism.

19. A display system comprising:
a screen for displaying a source image;
a plurality of image generators each generating a portion of said source image on said screen, wherein portions of said source image generated by adjacent image generators overlap in regions at their respective peripheries but need not, absent weighting, correspond in position and intensity to said source image; and
an image processor providing image data to said image generators wherein image data for pixels of the portions of said source image at least in the overlap regions are weighted relative to position and intensity to combine to display said source image.

20. The display system of claim 19 wherein said image processor weights the image data by proportionately weighting at least a given characteristic of particular pixels between the respective particular pixels generated by each respective image generator.

21. The display system of claim 20 wherein said given characteristic of the particular pixel includes at least one of pixel brightness and pixel position.

22. The display system of claim 19 wherein said image processor weights the image data by proportionately weighting the image data of said pixels in the overlap regions.

23. The display system of claim 19 wherein said image processor weights the image data by weighting at least a given characteristic of particular pixels in the neighborhood of the particular pixels.

24. The display system of claim 23 wherein said given characteristic of the particular pixels in the neighborhood includes at least one of pixel brightness and pixel position.

25. The display system of claim 19 further comprising a sensor positioned for sensing at least pixels in the overlap regions and wherein said image processor is responsive to said sensor for adjusting the weighting of the image data representative of particular pixels in the overlap regions.

26. A modular display system comprising:
a screen on which a unitary image is to be displayed; and
a plurality of image generating modules positioned adjacent each other and on a side of said screen opposite that on which the unitary image is to be viewed, wherein each said image generating module comprises:
at least one image generator responsive to image data for generating a predetermined portion of the unitary image on said screen, wherein pixels thereof along each edge of the predetermined portion include pixels that are also along adjacent edges of adjacent predetermined portions of the unitary image that are generated by respective adjacent image generator modules, whereby adjacent predetermined portions of the unity image overlap in an overlap region near their adjacent edges;
an image processor for generating the image data representative of said predetermined portion of said unitary image responsive to predetermined portions of unitary image data and to sensor data; and
a sensor located proximate said screen for generating sensor data representative of at least pixels of the predetermined portion of the unitary image on said screen in the regions of overlap of adjacent predetermined portions of the unitary image.

27. The modular display system of claim 26 wherein said screen includes a plurality of screen portions in contiguous edge-to-edge relationship, and each said screen portion is associated with a respective one of said plurality of image generating modules.

28. The modular display system of claim 27 wherein pixels along a first edge of the predetermined portion of the unitary image generated by a first one of said image generating modules are displayed in a region near an edge of the screen portion associated with a contiguous one of said image generating modules that is contiguous to the first one of said image generating modules.

29. The modular display system of claim 26 wherein each pixel of said unitary image has a given value, and wherein respective image processors of adjacent ones of said image generating modules apportion the given value of pixels in the overlap region of said adjacent ones of said image generating modules between the respective image data of said adjacent ones of said image generating modules.

30. The modular display system of claim 29 wherein the combination of the pixel values of pixels in the overlap region of said adjacent ones of said image generating modules is substantially said given value.

31. The modular display system of claim 29 wherein said image processors of said adjacent ones of said image generating modules are responsive to said sensor data for apportioning the given value of the pixels in the overlap region of said adjacent ones of said image generating modules.

32. A method of forming a pixelated image comprising:
   forming two contiguous pixelated sub-images having a region of overlap at their common edge;
   determining the value of particular pixels of the pixelated sub-images at least in said region of overlap;
   determining a correction function for changing the determined value of the particular pixels of the pixelated sub-images in at least said overlap region to a given value representative of pixels of the pixelated image in corresponding positions of the pixelated image; and
   applying said correction function to respective pixel values of each of said pixelated sub-images for each of said particular pixels at least in said overlap region.

33. The method of claim 32 wherein determining the value of particular pixels of the pixelated sub-images at least in said region of overlap includes determining the combined value thereof, and wherein determining a correction function includes changing the determined combined value of the particular pixels to the given value.

34. The method of claim 33 wherein said determining a correction function includes reducing by a ratio of said given value to said determined combined value.

35. The method of claim 33 wherein said determining a correction function includes weighting in accordance with a number of pixels contributing to said determined combined value.

36. The method of claim 32 wherein said determining the value includes sensing at least one of the brightness and the position of the particular pixels, and wherein the value of the particular pixels is determined from the at least one of the sensed brightness and position thereof.

37. The method of claim 32 further comprising applying said correction function to respective pixel values of each of said pixelated sub-images for others of the pixels in said overlap region.

38. The method of claim 32 further comprising:
   determining the value of particular pixels in respective regions of said two contiguous sub-images other than said region of overlap;
   determining a second correction function for changing the determined value of the particular pixels in said respective regions of said two contiguous sub-images to a second given value; and
   applying said second correction function to respective pixel values of each of said pixelated sub-images for each of said particular pixels in said respective regions of said two contiguous sub-images other than said overlap region.

39. The method of claim 38 wherein at least one of said determining a correction function and said determining a second correction function comprises:
   weighting at least a given characteristic of the values of particular pixels of at least one of said two contiguous pixelated sub-images.

40. The method of claim 39 wherein said weighting at least a given characteristic includes weighting at least one of pixel brightness and pixel position.

41. The method of claim 39 wherein said weighting at least a given characteristic includes weighting the respective given characteristic of particular pixels in a neighborhood of said at least one of said two contiguous pixelated sub-images.

42. The display system of claim 1 wherein said image generator comprises a projector of light illuminating said screen, and
   wherein said projector of light is selected from the group consisting of an optical projector, a cathode ray tube, and a liquid crystal display including a light source.

* * * * *